US006772870B2

(12) United States Patent
Sugai et al.

(10) Patent No.: US 6,772,870 B2
(45) Date of Patent: Aug. 10, 2004

(54) TOKEN COUNTING AND SORTING APPARATUS

(75) Inventors: Katsumi Sugai, Nagoya (JP); Nobuyuki Nakatani, Himeji (JP); Masanari Nakamura, Shiojiri (JP)

(73) Assignees: Sugai General Industries Ltd., Aichi-ken (JP); Wing Design Co., Prev., Hyougo-ken (JP)

( * ) Notice: Subject to any disclaimer, the term of this patent is extended or adjusted under 35 U.S.C. 154(b) by 217 days.

(21) Appl. No.: 10/169,131

(22) PCT Filed: Jul. 26, 2001

(86) PCT No.: PCT/JP01/06483

§ 371 (c)(1),
(2), (4) Date: Jun. 25, 2002

(87) PCT Pub. No.: WO02/067208

PCT Pub. Date: Aug. 29, 2002

(65) Prior Publication Data

US 2003/0019716 A1 Jan. 30, 2003

(51) Int. Cl.$^{7}$ .................................................. G06F 9/00

(52) U.S. Cl. ......................... 194/217; 194/215; 453/12; 453/58

(58) Field of Search ................................. 194/217, 215, 194/216, 342; 453/3.9, 12, 29, 30, 58

(56) References Cited

U.S. PATENT DOCUMENTS

| | | | | |
|---|---|---|---|---|
| 1,096,171 A | * 5/1914 | Johnson | ........................ | 235/32 |
| 1,096,172 A | * 5/1914 | Johnson | ........................ | 235/32 |
| 4,620,559 A | * 11/1986 | Childers et al. | ............... | 453/6 |
| 5,230,653 A | 7/1993 | Shinozaki et al. | ............. | 453/4 |
| 5,366,407 A | 11/1994 | Sentoku | .......................... | 453/3 |
| 5,480,348 A | 1/1996 | Mazur et al. | ................. | 453/10 |
| 5,607,351 A | 3/1997 | Schwartz | ..................... | 453/32 |
| 5,827,117 A | 10/1998 | Naas | ............................. | 453/9 |
| 5,992,602 A | 11/1999 | Zweig et al. | ............... | 194/317 |
| 6,030,284 A | 2/2000 | Frank | ............................ | 453/3 |

FOREIGN PATENT DOCUMENTS

| | | | | |
|---|---|---|---|---|
| GB | 2 208 738 | 4/1989 | ............ | G07D/9/00 |
| JP | 4-102186 | 4/1992 | ............ | G07D/3/00 |
| JP | 2000-242822 | * 9/2000 | ............ | G07D/3/00 |
| WO | 95/23387 | 8/1995 | ............ | G07D/3/16 |

* cited by examiner

*Primary Examiner*—Donald P. Walsh
*Assistant Examiner*—Mark J. Beauchaine
(74) *Attorney, Agent, or Firm*—Merchant & Gould P.C.

(57) ABSTRACT

A token count/sort apparatus includes a rotary disc (10) for supporting tokens (11) and is manually rotatable, an arcuate transfer track (23) extending along the periphery of the disc and formed with one token transfer inlet (24). A plurality of sorting holes are formed in the transfer track for successively sorting and dropping the tokens in the order of increasing diameters as the tokens are transferred upstream toward downstream in the transfer direction. An endless transfer belt (30) rotates in synchronism with the rotary disc (10) by intermediate gears (40), (41) and (42), thereby transferring the tokens (11) in a pressed condition. A token discerner (31) is provided between the token transfer inlet (24) and the sorting hole located at the most upstream position in the transfer direction for counting the tokens and determining the diameters of the tokens. In a batch processing mode, the token discerner determines whether the preset value for the token count or sum is attained. When a photo interruptor (88) detects the movement of the token (11) over a predetermined distance, the meshing between the intermediate gears (41) is released by a solenoid (83) to temporarily stop the transfer belt (30). Thus, the batch processing of the tokens can be performed by such a compact apparatus.

14 Claims, 18 Drawing Sheets

TOKEN COUNTING AND SORTING APPARATUS

TECHNICAL FIELD

The present invention relates to a token counting and sorting apparatus for unassorted different tokens such as monetary coins (of different denominations) or deal with medals for playing with game machines. In particular it relates to an apparatus capable of sorting tokens in accordance with their kinds (denominations) and switchable between two modes, i.e., a normal counting mode in which the total number of the sorted tokens and the individual numbers of the respective kinds (denominations) of the tokens are calculated, and a batch processing mode in which the current sorting job is temporarily stopped when the calculated token count or token sum reaches the preset value.

BACKGROUND ART

Token counting and sorting apparatuses of several kinds have been proposed so far. Taking an apparatus disclosed in U.S. Pat. No. 5,922,602 for example, it comprises a rotary disc to which unassorted tokens of different kinds are supplied, and a second sorting plate arranged adjacent to the rotary disc. The second sorting plate is provided with a circumferential sorting track for discerning differences in diameters of the tokens at sorting holes, and with elastic upward fingers in facing relation to the track for transferring the tokens. The track is formed with a plurality of sorting holes whose diameters are made greater along the transfer path correspondingly to the token's sizes. The tokens to be sorted are transferred with their outer circumferential sides held in sliding contact with the outer circumferential wall surface (a guide member) of the sorting track. A sensor comprising an induction coil is provided at an upstream side of the token transfer track in order to determine, based on the material of a token, whether the token is a proper (authorized) one or not. The outer circumferential wall surface is provided, at a location downstream from the sensor, with a rounded shaft which has a notch at its top end and is rotatable about the axis. When a token is determined as improper (unauthorized), the round shaft rotates so that the circumferential portion of the round shaft moves radially inward of the sorting track. As a result, the improper (unauthorized) token hits against the circumferential convex curve of the round shaft and is moved upstream from the sorting holes to be discharged from a trap hole.

As another example, JP-A-9-512927 (WO95/23387) discloses an apparatus comprising a rotary disc which is rotatable by a driving motor and to which tokens of different kinds are supplied from an upper supplying section. The apparatus also comprises a stationary sorting head disposed above the rotary disc in facing relation to this disc. The sorting head has a lower surface formed with a plurality of exit channels for guiding tokens to exiting positions along the outer circumference, or periphery, of the rotary disc. A sieving mechanism is provided for discerning effective tokens from ineffective tokens or for collecting a predetermined number of tokens in a relevant storage section. This mechanism is disposed at the one or some of the exit channels or at the outside of the periphery of the rotary disc to be adjacent to the one or more exit channels. By utilizing the sieving mechanism, the tokens can be sifted into two or more storage sections.

PROBLEMS TO BE SOLVED BY THE INVENTION

Unfavorably, the disclosed structure of the above U.S. patent increases the size of the apparatus, because the sieving mechanism is provided at the periphery of the rotary disc or at the exit channels. Another drawback is that when a storage section is filled with a predetermined number of tokens, the remaining tokens to be sorted need to be discharged into a certain storage section and then returned to the supplying section. Such a troublesome work hinders quick batch processing (the processing whereby a predetermined number of tokens are stored in the storage section).

It is possible that, in the apparatus of U.S. Pat. No. 5,992,602, the threshold of detection value by the induction coil is made adjustable so that only the tokens of the kind to be batch-processed can pass, whereas tokens of the other kinds are guided to the discharge hole. However, even in this manner, the discharged tokens should be returned to the supplying section to perform batch-processing for a different kind of tokens.

Further, no conventional apparatus has been proposed which is capable of performing batch processing for a particular kind of tokens and simultaneously performing normal count/sort operation with respect to other kinds of tokens.

It is an object of the present invention to provide a compact, easy-to-use token counting/sorting apparatus which is capable of solving the above conventional problems and can be switched between the normal count/sort processing and the batch processing.

DISCLOSURE OF THE INVENTION

According to a first aspect of the present invention, there is provided an apparatus for counting and sorting different kinds of tokens comprising: a rotary disc having an upper surface for supporting tokens supplied thereto, the disc being rotatable manually or by a driver; a generally arcuate token transfer track extending along an outer circumference of the rotary disc and including one token transfer inlet for receiving the tokens across the outer circumference of the rotary disc; a plurality of sorting holes formed in the token transfer track for successively sorting and dropping the tokens in an order of increasing diameters as the tokens are transferred from an upstream side toward an downstream side in a transfer direction; removable collecting and storing means arranged below the sorting holes for collecting and storing the tokens sorted; an annular transfer belt disposed above the outer circumference of the rotary disc for rotation together with the rotary disc to transfer the tokens while pressing the tokens against a surface of the token transfer track; a token discerner provided in the token transfer track between the token transfer inlet and a sorting hole located at a most upstream position in the transfer direction for counting the tokens and determining diameters of the tokens; a controller for calculating results obtained by the token discerner; a display for displaying the calculated results which include the count of tokens for each kind and a total count of the tokens; and switching means for switching between a normal counting mode and a batch processing mode, the batch processing mode providing an adjustable preset value for a token count or a sum to temporarily interrupt the token transfer to the sorting holes when the preset value is attained; wherein the controller performs the normal counting mode or the batch processing mode in accordance with switching of the switching means.

According to the above arrangements of the present invention, use is made of a single rotary disc to support the supplied tokens of different kinds. Outside of the rotary disc, a token transfer inlet is provided. The token transfer track for transferring the tokens has an arcuate configuration, and the token transfer felt is rotated in a plane above the arcuate portion. Thus, the token counting and sorting apparatus of the present invention are made advantageously smaller than the prior art apparatus both in the vertical and the horizontal directions. In addition, the apparatus needs only a single rotary disc and a single transfer belt. This is advantageous to simplifying the power transmission mechanism.

Further, the batch processing mode, which is provided additionally to the normal counting mode, can be performed simply by interrupting the power transmission to the transfer belt arranged to face the arcuate token transfer track. Therefore, the structure of the invention requires a smaller number of parts than the conventional structure. Also, there is no need to provide extra parts outside of the token transfer track. This is advantageous to downsizing the token counting and sorting apparatus.

Still further, in accordance with the batch processing mode of the present invention, the storage of the tokens of a desired kind is made impossible after the preset value for the particular tokens is attained. This considerably facilitates the handling of the tokens by the prescribed quantities for their respective kinds.

According to a second aspect of the present invention, there is provided an apparatus for counting and sorting tokens comprising: a rotary disc having an upper surface for supporting tokens supplied thereto, the disc being rotatable manually or by a driver; a generally arcuate token transfer track extending along an outer circumference of the rotary disc and including one token transfer inlet for receiving the tokens across the outer circumference of the rotary disc; a plurality of sorting holes formed in the token transfer track for successively sorting and dropping the tokens in an order of increasing diameters as the tokens are transferred from an upstream side toward an downstream side in a transfer direction; removable collecting and storing means arranged below the sorting holes for collecting and storing the tokens sorted; an annular transfer belt disposed above the outer circumference of the rotary disc for rotation together with the rotary disc to transfer the tokens while pressing the tokens against a surface of the token transfer track; a token discerner provided in the token transfer track between the token transfer inlet and a sorting hole located at a most upstream position in the transfer direction for counting the tokens and determining diameters of the tokens; a controller for calculating results obtained by the token discerner; a display for displaying the calculated results which include the count of tokens for each kind and a total count of the tokens; and switching means for switching between a normal counting mode and a denomination-specific batch processing mode, the denomination-specific batch processing mode providing an adjustable preset value for a token count or a sum of a predetermined particular kind of tokens to temporarily interrupt the token transfer to the sorting holes when the preset value is attained while performing the normal counting and sorting with respect to other kinds of tokens. The controller performs the normal counting mode or the denomination-specific batch processing mode in accordance with switching of the switching means.

According to the above arrangements of the present invention, use is made of a single rotary disc to support the supplied tokens of different kinds. Outside of the rotary disc, a token transfer inlet is provided. The token transfer track for transferring the tokens has an arcuate configuration, and the token transfer felt is rotated in a plane above the arcuate portion. Thus, the token counting and sorting apparatus of the present invention are made advantageously smaller than the prior art apparatus both in the vertical and the horizontal directions. In addition, the apparatus needs only a single rotary disc and a single transfer belt. This is advantageous to simplifying the power transmission mechanism.

Further, the denomination-specific batch processing mode, which is provided additionally to the normal counting mode, can be performed simply by interrupting the power transmission to the transfer belt arranged to face the arcuate token transfer track when the preset value is attained for the tokens of the selected denomination. Therefore, the structure of the invention requires a smaller number of parts than the conventional structure. Also, there is no need to provide extra parts outside of the token transfer track. This is advantageous to downsizing the token counting and sorting apparatus.

Still further, in accordance with the denomination-specific batch processing mode of the present invention, the storage of the tokens of the selected denomination is made impossible after the preset value for the particular tokens is attained, while tokens of the other denominations are subjected to the normal counting operation. This considerably facilitates the handling of the tokens by the prescribed quantities for their respective kinds.

According to a third aspect of the present invention, the token counting and sorting apparatus may further comprise a power transmitter arranged between the rotary disc and the transfer belt, wherein the controller operates, in the batch processing mode or in the denomination-specific batch processing mode, to cause the power transmitter to stop power transmission to the transfer belt when the tokens travel a predetermined distance after the token discerner determines that the preset value is attained in the counting of the tokens.

With such an arrangement, the controlling in the batch processing mode and in the denomination-specific batch processing mode can be performed easily. Accordingly, the controlling system is advantageously simplified.

According to a fourth aspect of the present invention, the power transmitter is a gear transmitter including a plurality of gears arranged between the rotary disc and the transfer belt. Further, an actuator is provided for moving at least one intermediate gear to selectively stop power transmission to the transfer belt. Still further, the controller operates, in the batch processing mode or in the denomination-specific batch processing mode, to cause the actuator to stop power transmission to the transfer belt when the tokens travel a predetermined distance after the token discerner determines that the preset value is reached in the counting of the tokens.

Since power transmission to the transfer belt is established or interrupted by moving one intermediate gear by the actuator, power transmission can reliably be made on and off, in addition to the advantages obtained by the invention as set forth in claim 2. Therefore, in the batch processing, precise controlling can be performed in stopping the movement of the tokens reaching the preset value after the token has traveled the predetermined distance.

According to a fifth aspect of the present invention, the token counting and sorting apparatus may further comprise a power transmitter arranged between the rotary disc and the transfer belt, wherein the rotary disc is rotated by a motor, and wherein the controller operates, in the batch processing mode or in the denomination-specific batch processing mode, to stop the motor for stopping rotation of the disc and the belt when the tokens travel a predetermined distance after the token discerner determines that the preset value is reached as a result of passing of the tokens.

With this structure, the batch processing can be performed simply by controlling the driving and stopping of the motor.

According to a sixth aspect of the present invention, a common value is set as the preset value for tokens of different kinds in the batch processing mode. Thus, the controlling of the motor for the batch processing can be performed much more easily, and the sieving of all the tokens to be sorted into the predetermined storages can be performed quickly.

According to a seventh aspect of the present invention, the collecting and storing means is provided with a removable storage cylinder for storing a preset number of tokens that corresponds to the preset value. With such an arrangement, the replacement of the storage cylinder can be easily performed. Accordingly, the sieving of the tokens into the relevant cylinders is quickly performed.

According to an eighth aspect of the present invention, the token counting and sorting apparatus may further comprise a lower casing for the rotary disc and the token transfer track and an upper casing openable on the lower casing. The upper casing rotatably supports a rotary ring with which the transfer belt is associated. The upper casing is provided with a token feed opening radially inward of the rotary ring for feeding the tokens toward the rotary disc. The rotary ring is provided with a power transmission unit to be rotated by a driving mechanism arranged on a side of the lower casing.

With such an arrangement, by opening the upper casing, the transfer belt together with the rotary ring can be separated away from the token transfer track, so that any foreign object caught on the token transfer track can be easily removed. Further, power transmission from the rotary disc to the rotary ring becomes possible just by closing the upper casing relative to the lower casing.

MODE FOR CARRYING OUT THE INVENTION

The present invention can be carried out in many modified or alternative ways, though the drawings only show some particular embodiments. Hereinbelow, the embodiments of the present invention will be described below with reference to these drawings.

It should be noted, however, that the present invention is not limited to these particular embodiments, but includes all modified and alternative modes that fall within the spirit and scope of the present invention defined in the claims.

Figure 1:
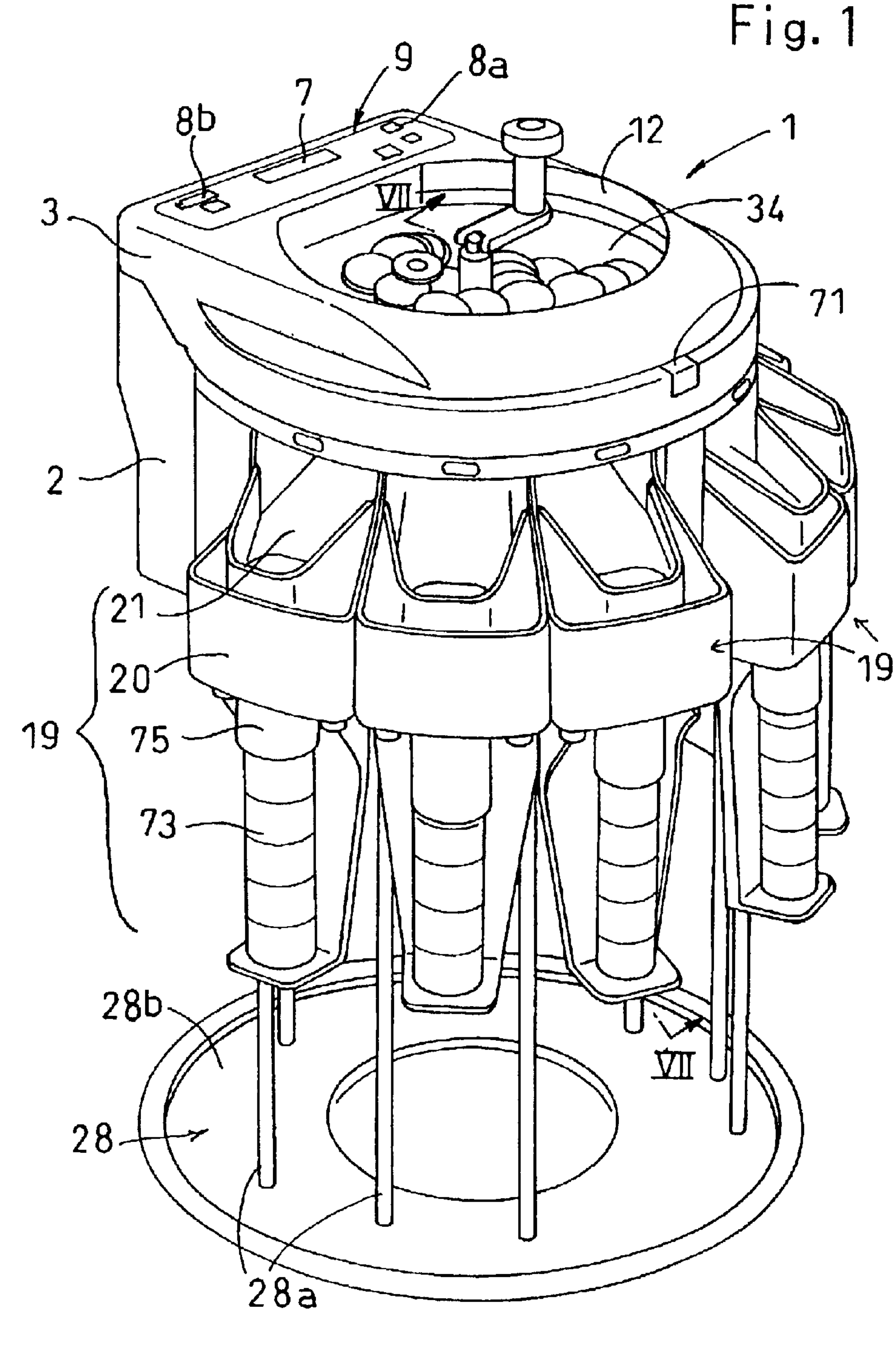
FIG. 1 is an overall perspective view showing a token counting and sorting apparatus embodying the present invention.

As shown in FIGS. 1 through 7, the token counting and sorting apparatus 1 according to the present invention comprises a lower casing 2 and an upper casing 3 which are made of a synthetic resin and connected to each other by hinges 4 at their rear end portions for opening and closing movement. The upper casing 3 may be releasably attached to the lower casing 2. As shown in FIG. 1, the lower casing 2 is supported by a stand 28 that is made up of a plurality of posts 28*a* and a disc-shaped base 28*b* in a manner such that the attachment or detachment of storage units 19 can be readily performed. The storage units are removably attached to the outer circumference of the lower casing 2 for serving as collecting and storing means, as will be described later.

Figure 2:
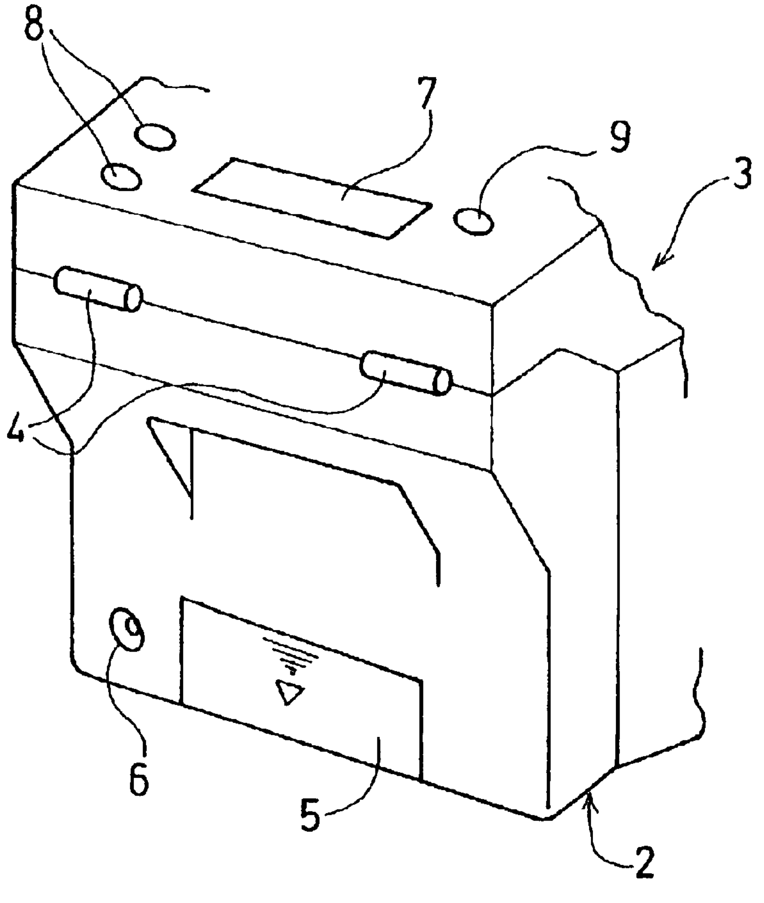
FIG. 2 is perspective view showing the rear portion of the token counting and sorting apparatus.

As shown in FIG. 2, the lower casing 2 has a rear surface which is provided with a lid 5 for opening and closing a battery box for accommodating a portable battery such as a dry battery. The rear surface is further provided with a connector 6 for connection to an output of an AC adapter for converting commercial AC current to predetermined direct current. The upper casing 3 has an upper surface which is provided, at the rear portion thereof, with a display 7 for displaying, for example, the number and sum of tokens 11 for each kind as well as the total number and sum of all tokens 11 detected by token discerner which will be described later, while also provided with a switch section 9 including a display selection switch 8*a*, a power switch 8*b*, a start/stop switch 8*c*, increasing/decreasing switches 8*d*, 8*e* for changing the preset values in batch processing, and a clear switch 8*f*. The upper casing 3 is generally centrally formed with a token feed opening 12 which is generally equal in diameter to a rotary disc 10 and extends vertically through the upper casing for feeding the tokens 11 to the upper surface of the rotary disc 10, which will be described later.

In this embodiment, the tokens 11 to be counted and sorted may be EURO coins (unit: EURO) under European Monetary System including eight denominations, i.e. 0.01 EURO (diameter: 16.25 mm), 0.02 EURO (diameter: 18.75 mm), 0.05 EURO (diameter: 21.25 mm), 0.10 EURO (diameter: 19.75 mm), 0.20 EURO (diameter: 22.25 mm), 0.50 EURO (diameter: 24.25 mm), 1 EURO (diameter: 23.25 mm), and 2 EURO (25.75 mm) in the order of increasing diameters. The tokens may be coins of the Japanese currency including six denominations i.e. 1-yen, 50-yen, 5-yen, 100-yen, 10-yen, and 500-yen in the order of increasing diameters. The tokens 11 may be circular metal pieces for use with game machines.

The token counting and sorting apparatus 1 according to the present invention includes the rotary disc 10 which has an upper surface for supporting the tokens 11 of different kinds or denominations (having different diameters) and which is rotatable manually or by a driver. The apparatus further includes a generally arcuate token transfer track 23 extending along the periphery of the rotary disc 10 and including a token transfer inlet 24 for receiving tokens across the periphery of the rotary disc 10. The token transfer track 23 is formed with a plurality of sorting holes 25 for successively sorting and dropping tokens 11 in the order of increasing diameters as the tokens 11 are transferred from the upstream side toward the downstream side in the transfer direction. Disposed above the periphery of the rotary disc 10 is a transfer belt 30 which rotates together with the rotary disc to transfer the tokens 11 while pressing the tokens against the token transfer track 23. In the token transfer track 23, a token discerner 31 for counting the tokens while determining diameters of the tokens is provided between the token transfer inlet 24 and the sorting hole 25 which is located at the most upstream position in the transfer direction. The apparatus further includes an electronic controller 65 for calculating results obtained by the token discerner 31 or for conducting the controlling during a batch processing mode which will be described later. The results calculated by the controller 65, i.e. the count of tokens 11 for each kind (denomination) and a total count of the tokens for example are displayed at the display 7.

Figure 8:
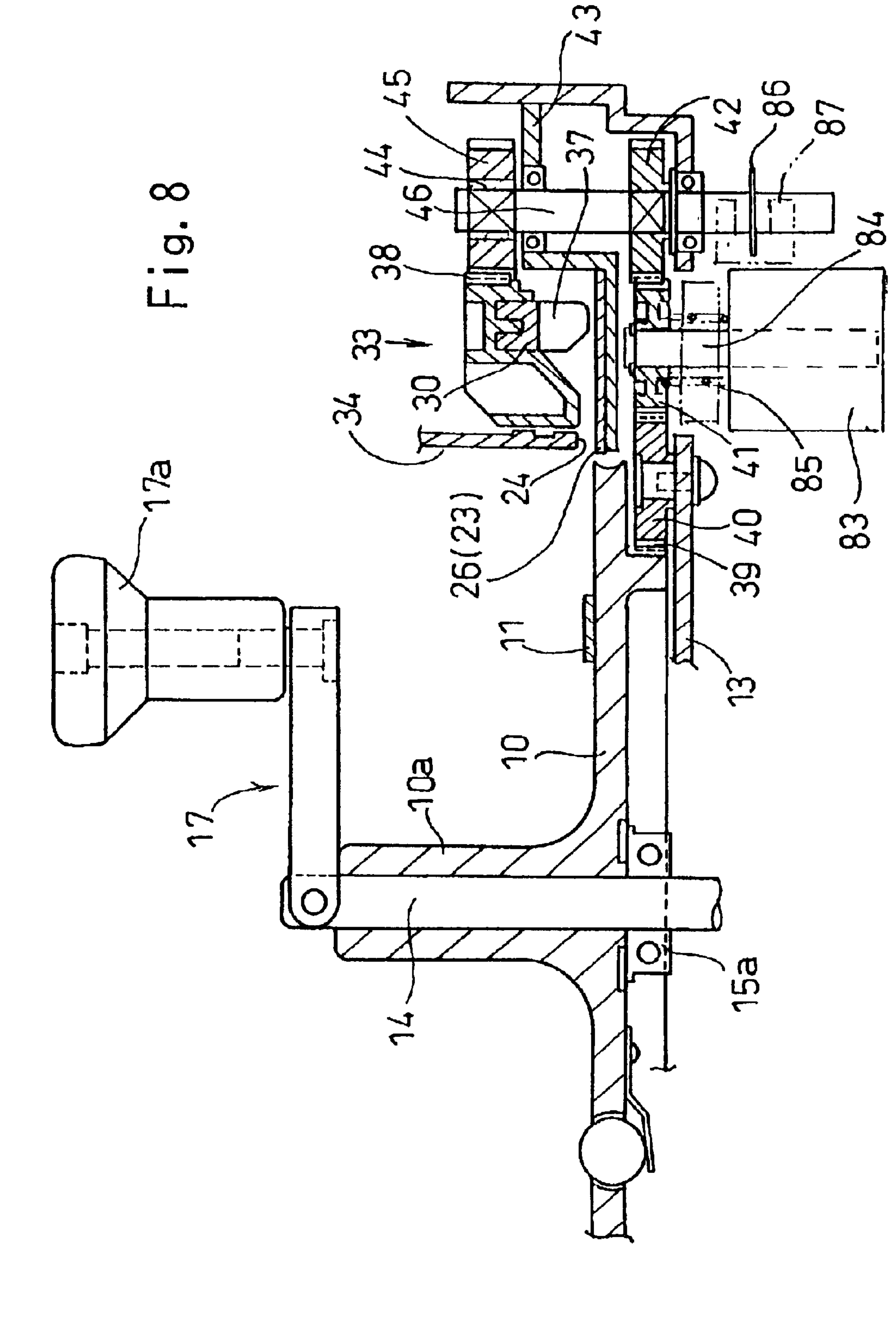
FIG. 8 is an enlarged sectional view taken on lines VIII—VIII in FIG. 5, which is partially cut away.

The rotary disc 10 in this embodiment shown in FIGS. 1, 5, 7 and 8 is driven manually and the obverse (upper) surface of the rotary disc 10 is centrally formed with an upwardly projecting boss 10*a* to which an upright shaft 14 is fitted. The shaft 14 has a lower portion rotatably supported by bearings 15*a*, 15*b* provided at a central cylinder 13*a* of an upper partition plate 13 defining the upper surface of the lower casing 2. The lower surface of the rotary disc 10 is supported, at the outer circumferential portion thereof, by a plurality of support rollers 16 provided at a stepped portion of the upper partition plate 13 for horizontal rotation of the disc. The shaft 14 has an upper end to which a handle 17 is pivotally connected via a pin. The handle 17 has a grip 17*a* which can be oriented to project upward (as shown in FIGS. 1 and 8) for manual rotation by the operator. The grip 17*a* can be folded downward for decreasing the overall height of the apparatus when the apparatus is not used.

The upper partition plate 13 of the lower casing 2 is formed with some large through-holes 18 (eight holes in this embodiment) which are generally rectangular and circumferentially arranged as spaced from each other. Storage units 19 for collecting and storing tokens dropped through the holes are removably attached to the lower casing below the respective through-holes 18. As shown in FIGS. 1, 7 and 15–17, each of the storage units 19 includes a generally triangular mounting box 20 which is made of a synthetic resin and is removably attached to a hollow portion 2*a* at the outer circumference of the lower casing 2, and also includes a slide portion 21 disposed in the mounting box 20. The storage unit further includes a connection cylinder 75 connected to the lower end of a cylindrical path 21*a* provided at the lower end of the slide portion 21, and a support stand 74 connected to a bottom plate 20*a* of the mounting box 20 to extend downward therefrom. A support plate 21*b* provided at a lower portion of the slide portion 21 is fixed to the bottom plate 20*a* of the mounting box 20 with a screw 76 (See FIGS. 7 and 16). The support stand 74 includes an upper end plate 74*a* provided with upwardly projecting bosses 77, each of which is fitted into a cylindrical support 78 projecting downward from the bottom plate 20*a* and fixed thereto with a screw 79.

Figure 17:
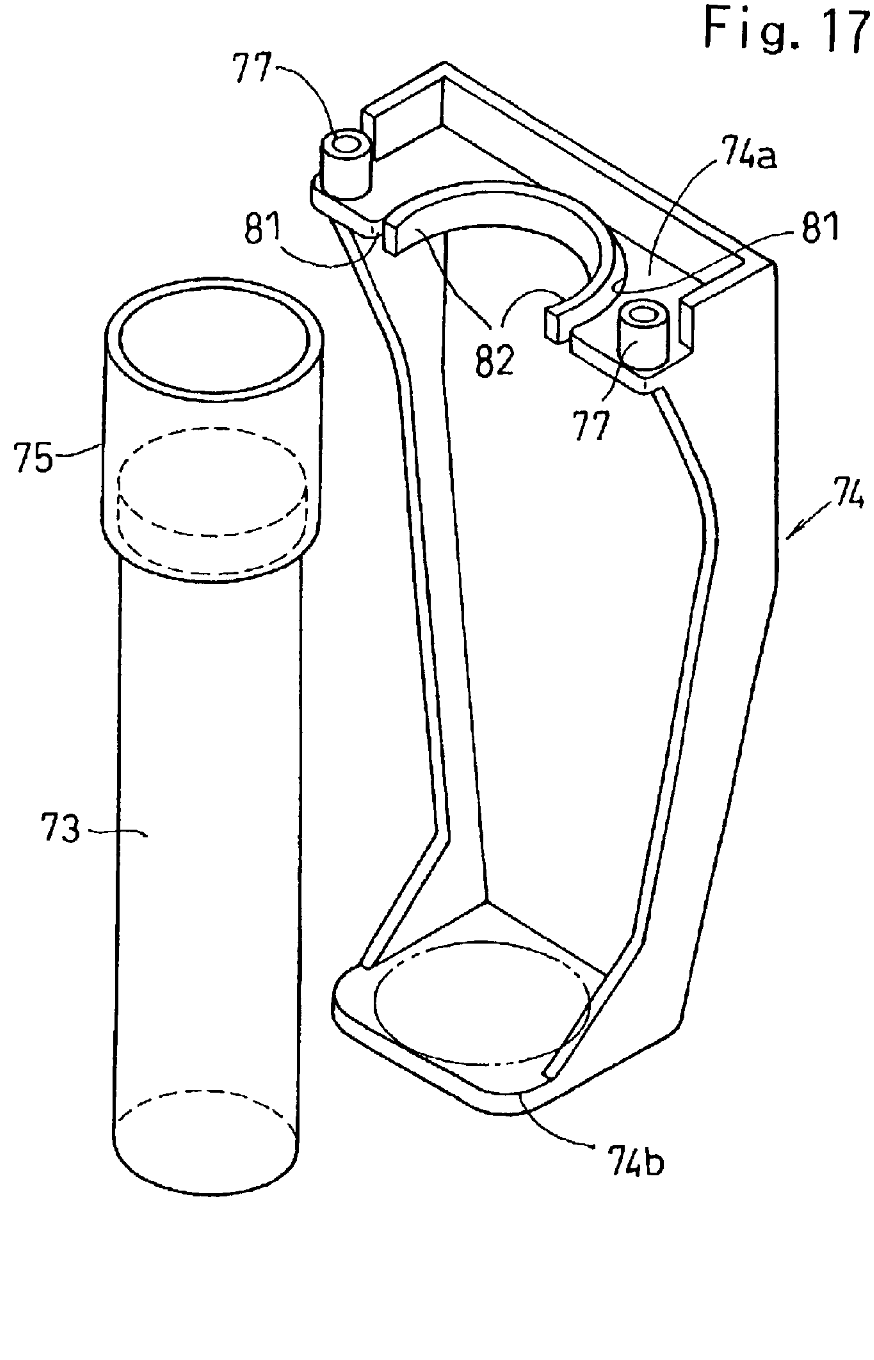
FIG. 17 is a perspective view showing a storage cylinder, a support stand, and a connection cylinder in the storage unit.

Further, each of the mounting boxes 20 is formed, at the radially inner side thereof, with an engagement hole 80 for engagement with a corresponding one of engagement hooks 22 projecting radially outward from the central cylinder 13*a* of the lower casing 2 or the upper partition plate 13 (See FIG. 17). Thus, the mounting box 20 is prevented from unintentionally detached to project outward of the lower casing 2.

The upper end plate 74*a* of each support stand 74 is centrally formed with a cutout 81 which is arcuate as viewed in plan and is provided with a pair of arcuate holding hooks 82. The paired holding hooks 82 elastically hold the outer circumference of the connection cylinder 75. The support stand 74 is provided with a lower end plate 74*b*, which supports the lower end of the storage cylinder 73 with the upper end of a storage cylinder 73 fitted in the connection cylinder 75. Each storage cylinder 73 capable of storing a predetermined number of tokens 11 (e.g. fifty tokens) of the same kind may be in the form of a bottomed cylinder made of a synthetic resin or paper. In the case where the storage cylinder 73 is made of paper, the tokens may be caused to drop through the upper end of the cylindrical path 21*a* at the slide portion 21 for holding the tokens in the connection cylinder 75. At least the inner diameter (and hence also the outer diameter in some cases) of each storage cylinder 73 corresponds to the diameter of the tokens 11 of the kind to be stored therein. Each of the box portions 20, each of the slide portions 21 and each of the cylindrical paths 21*a* may be common or equal in dimension to each other regardless of the kind of the tokens 11 to be stored. However, the inner diameter at the lower end of each connection cylinder 75 is made to correspond to the diameter of the tokens 11 of the kind to be stored therein, so that each kind of tokens 11 can be snugly laminated in the relevant storage cylinder 73.

The upper partition plate 13 is upwardly provided with the generally arcuate token transfer track 23 arranged along the periphery of the rotary disc 10 and including the transfer inlet 24 (See FIG. 5) for receiving tokens across the periphery of the rotary disc 10, as well as the plurality of sorting holes 25 for successively sorting and dropping tokens 11 in the order of increasing diameters as the tokens 11 are transferred from the upstream side toward the downstream side in the transfer direction. (In this embodiment, eight sorting holes for sorting EURO coins of eight denominations are illustrated.) That is, the sorting hole 25 at the most upstream position in the transfer direction has the smallest diameter, whereas the sorting hole 25 at the most downstream position in the transfer direction has the largest diameter.

In this embodiment, the sorting holes 25, which are generally rectangular as viewed in plan, are formed in an abrasion-resistant plate 26 made of e.g. an abrasion-resistant metal and constituting the bottom of the token transfer track 23. The upper partition plate 13 is formed with a generally arcuate upwardly projecting rib 27 constituting the outer circumferential wall of the token transfer track 23. The inner circumferential wall of the token transfer track 23 is defined by an outer edge 29*a* of a reference guide plate 29 which is generally arcuate and attached to the upper surface of the abrasion-resistant plate 26 outwardly of the periphery of the rotary disc 10 by crimping or screwing.

The reference guide plate 29 has a thickness which is slightly smaller than the minimum thickness of the tokens 11 to be sorted and specifically 1 mm in this embodiment. The outer edge 29*a* of the reference guide plate 29 (which corresponds to the inner circumferential wall of the token transfer track 23) is close to the periphery of the rotary disc 10 at a portion adjacent the token transfer inlet 24 and gradually deviates away (farther) from the periphery of the rotary disc 10 as it extends downstream in the transfer direction.

Each of the sorting holes 25 has an inner side 25*a* and an outer side 25*b* which extend in parallel with the outer edge 29*a* of the reference guide plate 29. The distance between the outer edge 29*a* of the reference guide plate 29 and the outer side 25*b* of each sorting hole 25 is roughly equal to the diameter of the token 11 to be sorted at that hole. [Note that this does not hold for the last sorting hole (located at the most downstream position).] Further, the distance between the outer edge 29*a* of the reference guide plate 29 and the inner side 25*a* is about 1 mm for supporting and transferring the token 11 with its circumferential edge held in slidable contact with the outer edge 29*a*. The distance between the outer edge 29*a* of the reference guide plate 29 and the outer side 25*b* of each subsequent sorting hole 25 progressively increases. For example, the distance between the outer edge 29*a* of the reference guide plate 29 and the outer side 25*b* of the sorting hole 25 located at the most upstream position is slightly larger than the diameter of 0.01 EURO coins having the smallest diameter but slightly smaller than the diameters of other larger EURO coins. Thus, among the coins (tokens 11) being transferred while sliding along the outer edge 29*a* of the reference guide plate 29, only 0.01 EURO coins drop into the sorting hole 25 located at the most upstream position while other larger coins (tokens 11) pass over that sorting hole 25.

In this way, the eight denominations of EURO coins, i.e. 0.01 EURO coins, 0.02 EURO coins, 0.10 EURO coins, 0.05 EURO coins, 0.20 EURO coins, 1 EURO coins, 0.50 EURO coins, 2 EURO coins successively drop into respective sorting holes 25 arranged from the upstream side toward downstream side in the transfer direction. Thus, the tokens can be sorted so that each storage unit 19 arranged at a respective sorting location can collect a single kind of tokens.

Tokens 11 having the largest diameter drop through the sorting hole 25 of the last position (located at the most downstream position) for storage in the relevant storage unit 19 so that the tokens 11 can be prevented from being transferred beyond the sorting hole 25 of the last position (located at the most downstream position).

Figure 3:
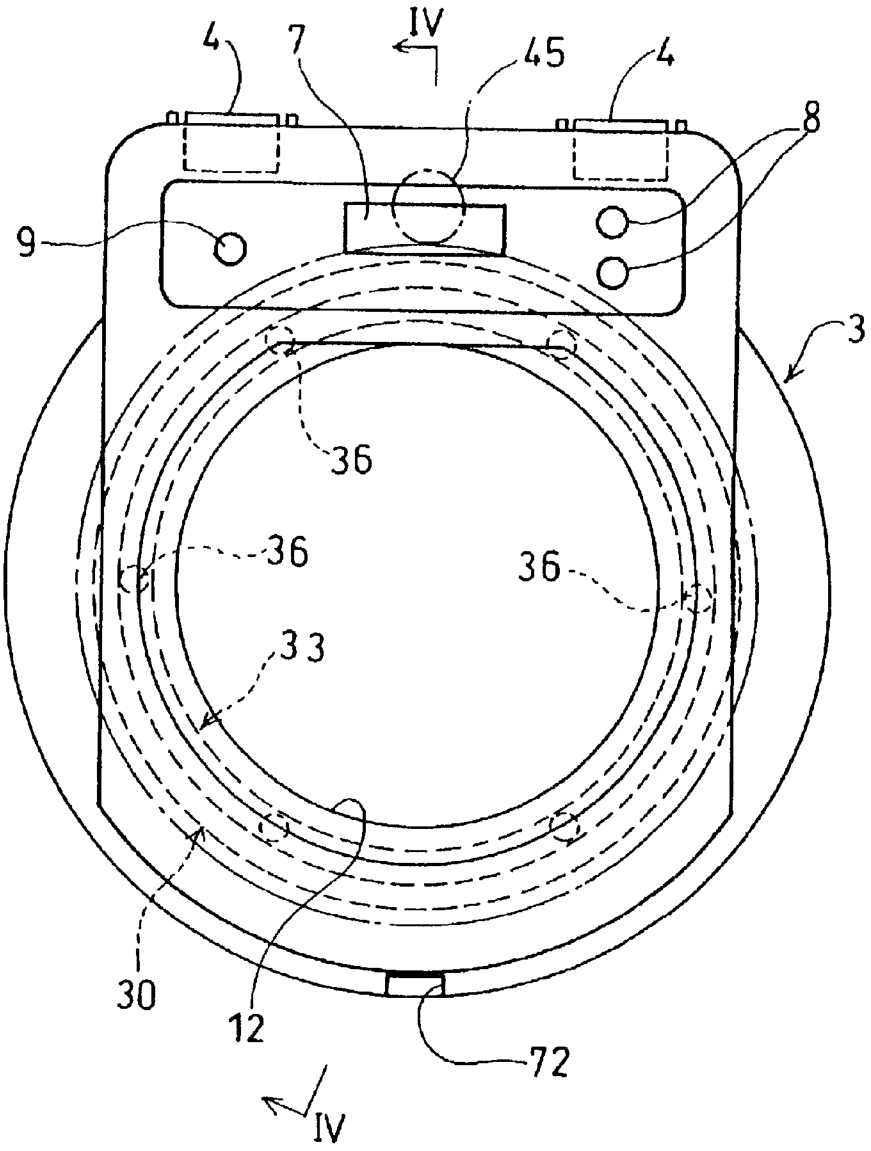
FIG. 3 is a plan view of the upper casing.
Figure 4:
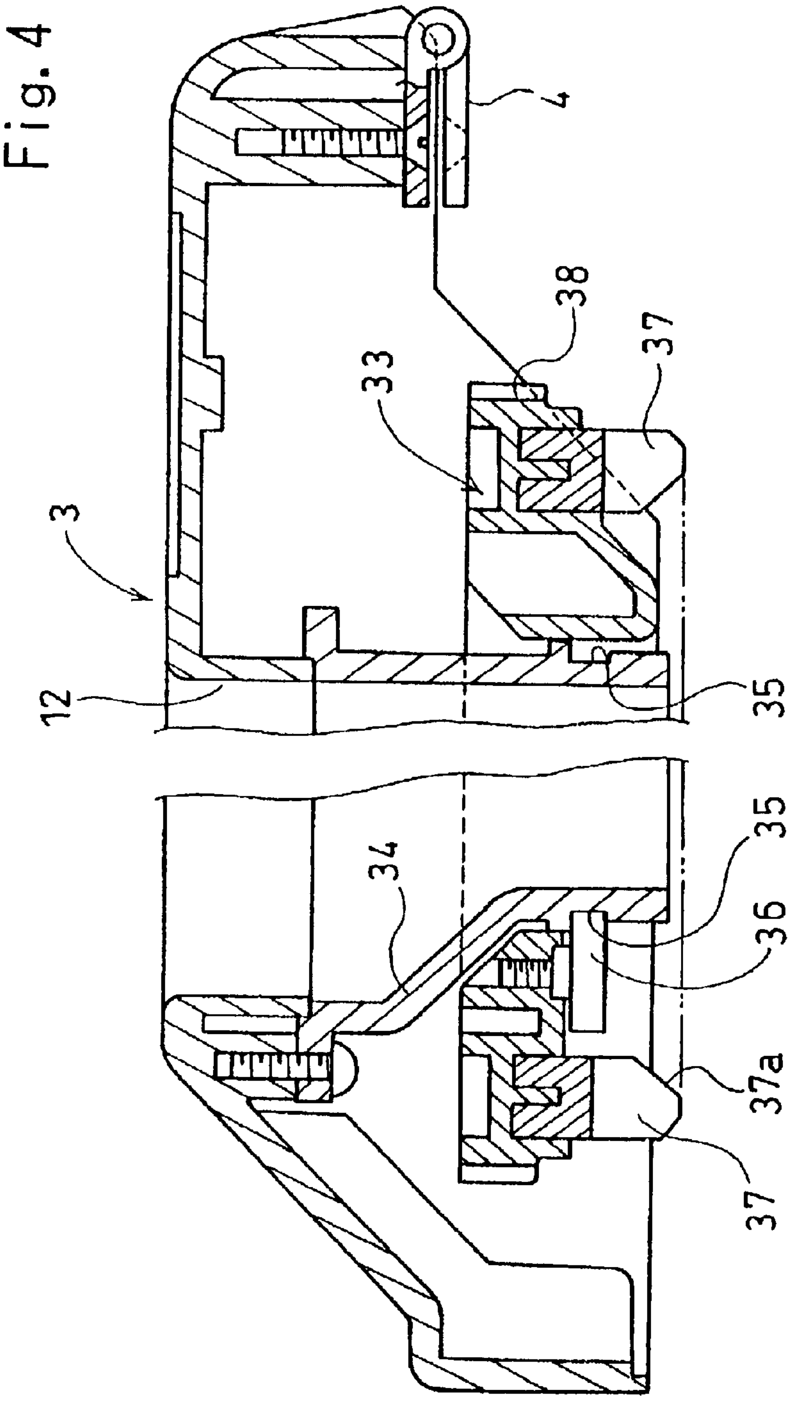
FIG. 4 is an enlarged sectional view taken on lines IV—IV in FIG. 3, which is partially cut away.
Figure 5:
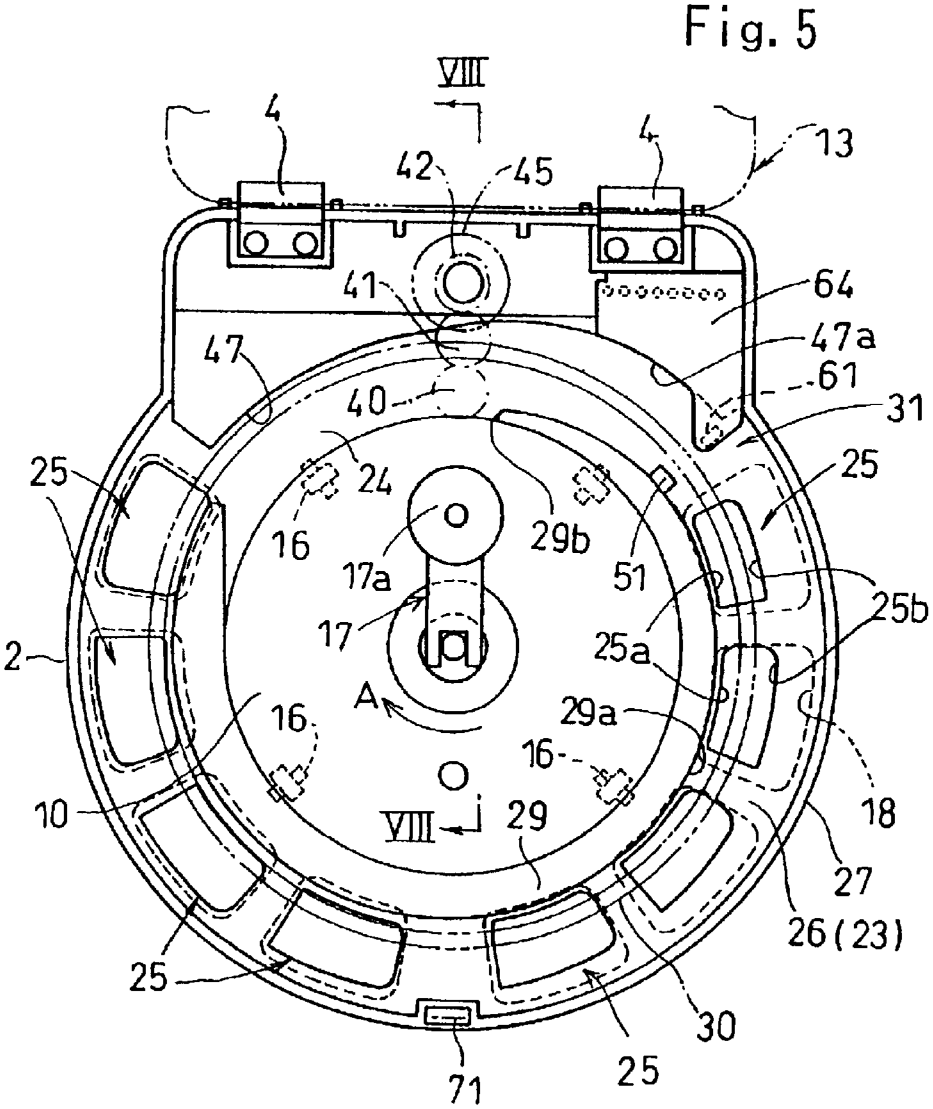
FIG. 5 is a plan view of the lower casing.
Figure 6:
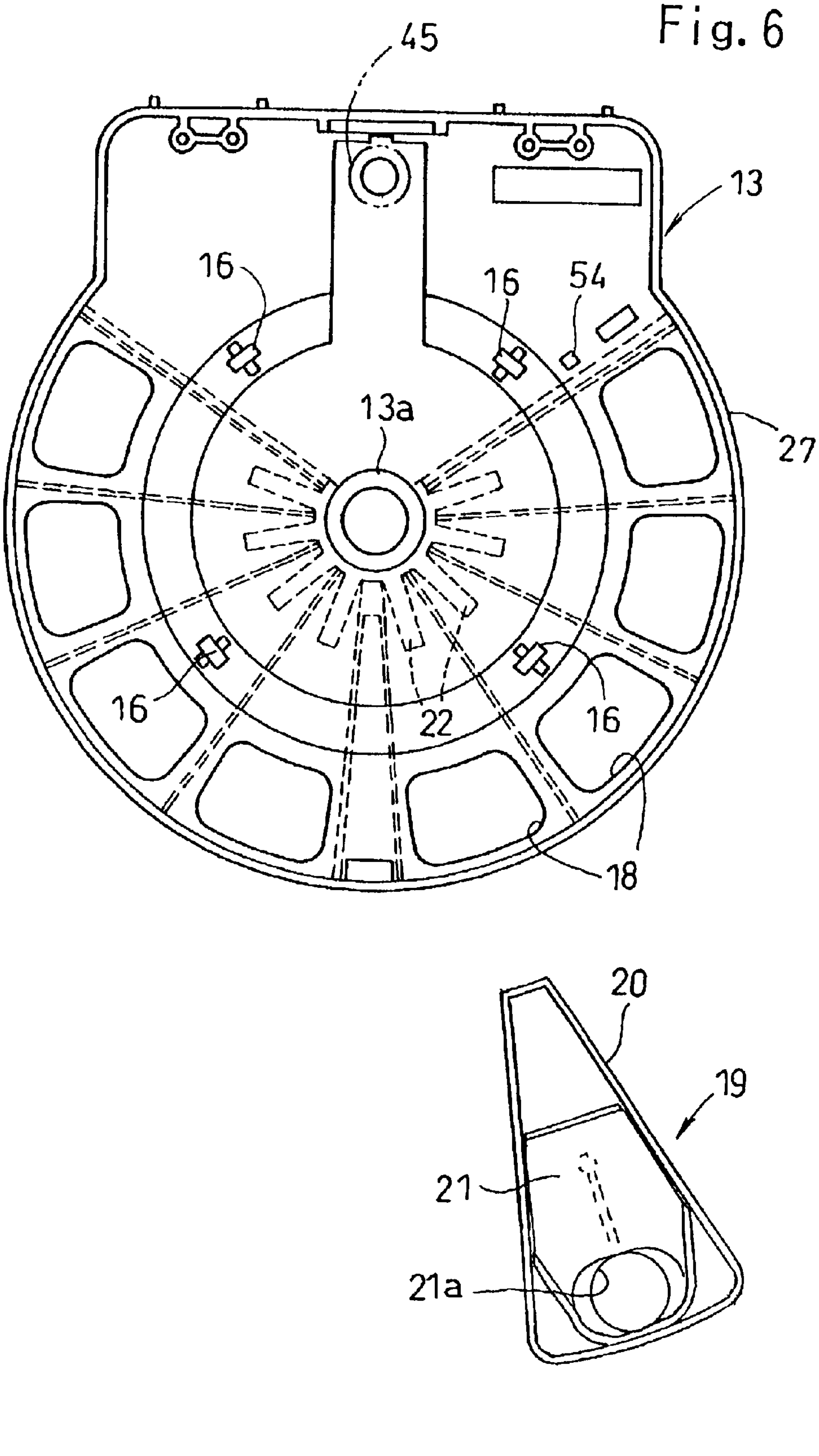
FIG. 6 is a plan view showing the upper partition plate and a storage unit.
Figure 7:
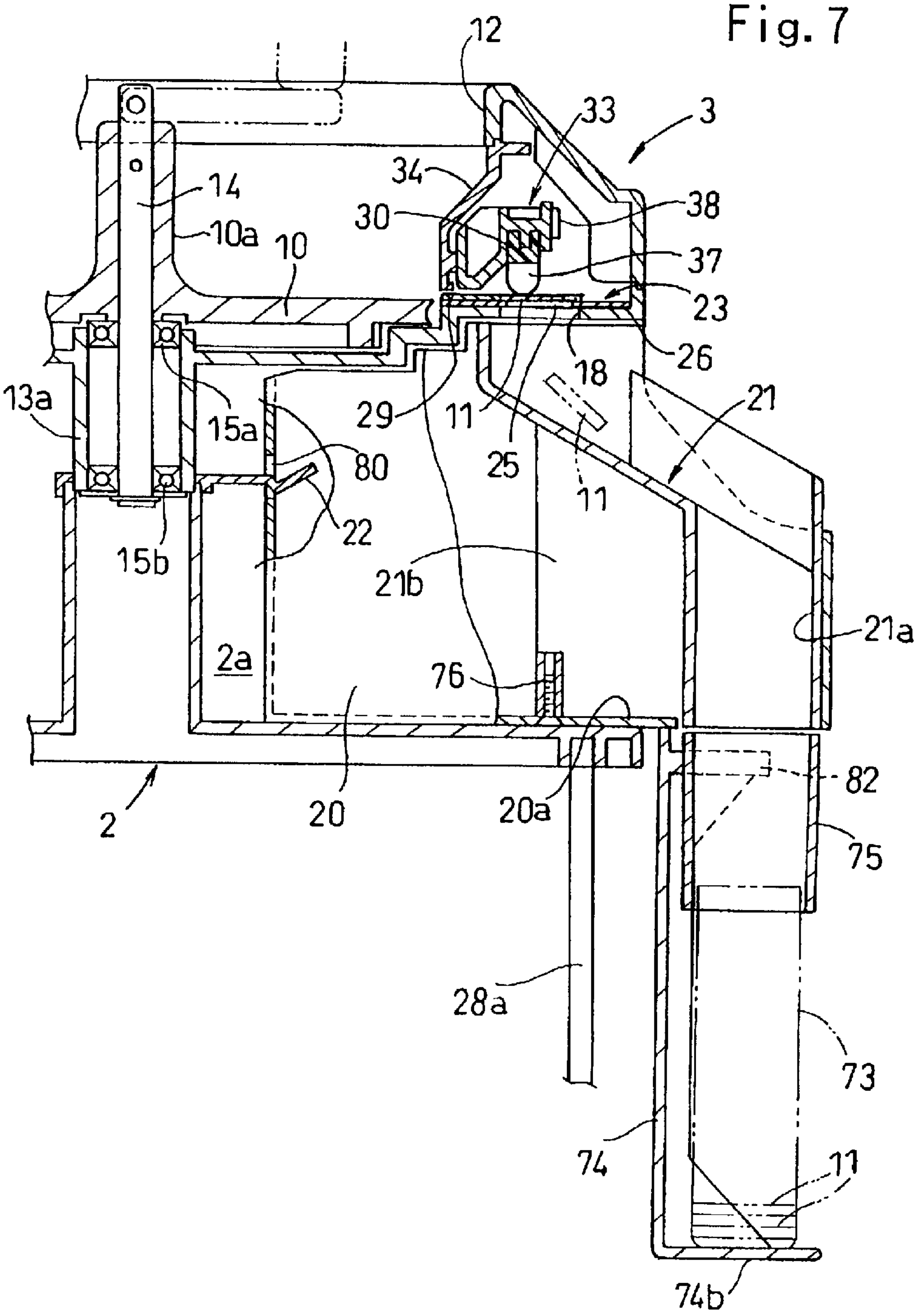
FIG. 7 is an enlarged sectional view taken on lines VII—VII in FIG. 1, which is partially cut away.

The ring-shaped (annular) transfer belt 30 is rotatably arranged on the lower side of the upper casing 3 and above the periphery of the rotary disc 10. The transfer belt 30 rotates together with the rotary disc 10 to transfer the tokens 11 downstream in the transfer direction while pressing, by fins 37 provided at the lower surface thereof, the tokens 11 against the upper surface of the abrasion-resistant plate 26 serving as the token transfer track 23. Specifically, as shown in FIGS. 3 through 5, a rotary ring 33 made of a synthetic resin is radially inwardly provided with a plurality of horizontal bearings 36 (six bearings in this embodiment). The horizontal bearings 36 slidably contact a ring-shaped rail 35 as a groove formed at the outer surface of a tube 34 made of a synthetic resin and constituting a lower part of the token feed opening 12 of the upper casing, thereby supporting the rotary ring 33 rotatably while also preventing unexpected detachment thereof.

Figure 9:
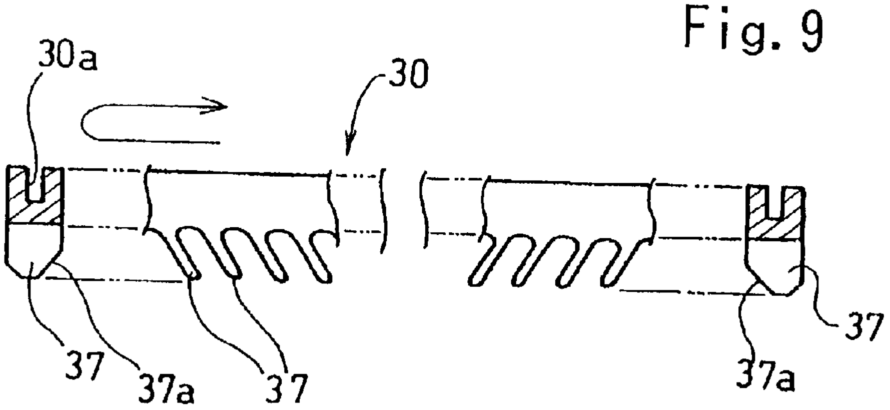
FIG. 9 is a sectional view showing the transfer belt.
Figure 10:
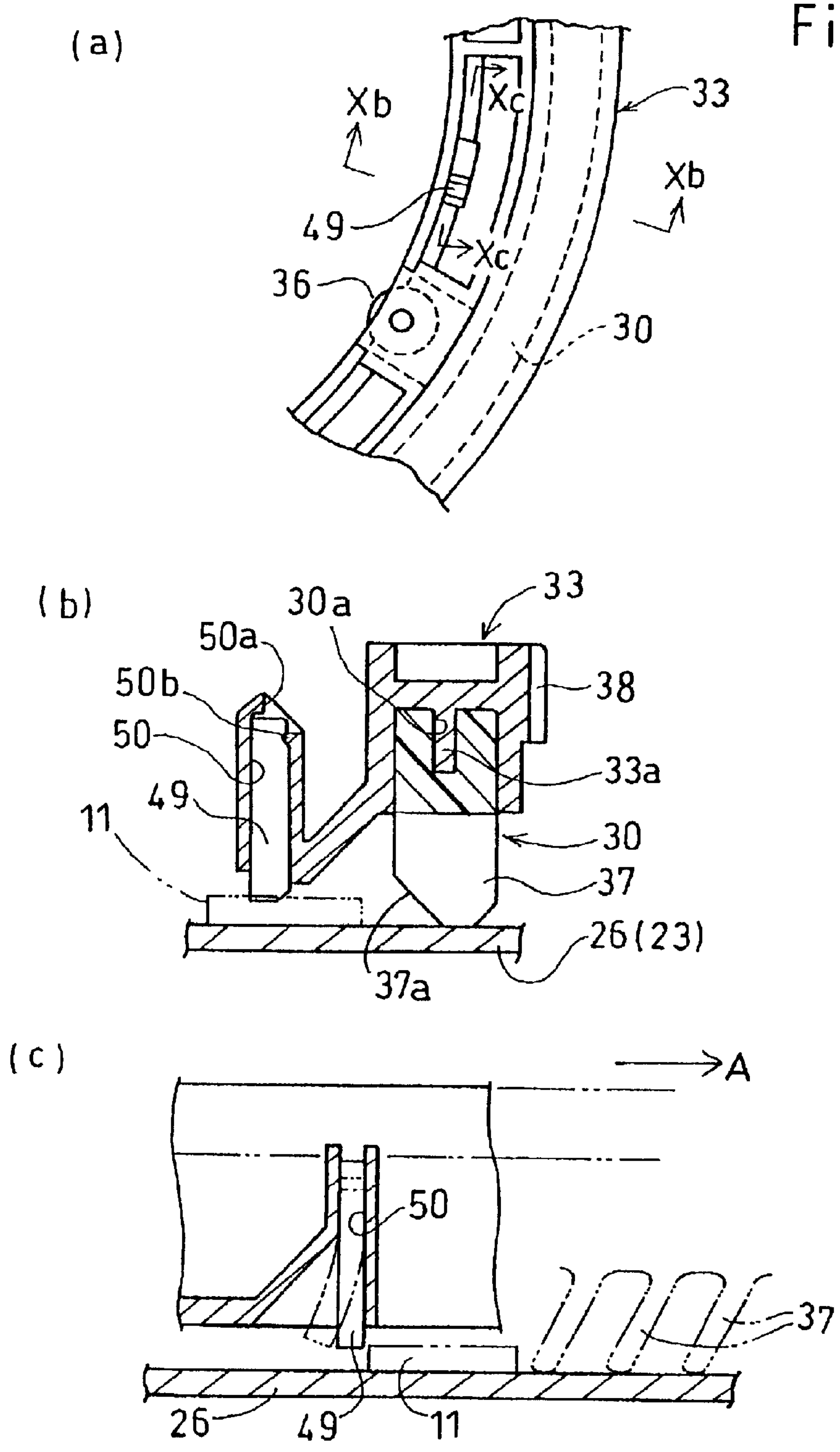
FIG. 10(*a*) is a plan view showing a part of the rotary ring, FIG. 10(*b*) is an enlarged sectional view taken on lines Xb—Xb in FIG. 10(*a*), and FIG. 10(*c*) is an enlarged sectional view taken on lines Xc—Xc in FIG. 10(*a*).

The ring-shaped transfer belt 30 (endless belt) is upwardly formed with a ring-shaped fitting groove 30*a* into which a ring-shaped engagement projection 33*a* formed at the lower surface of the rotary ring 33 is elastically fitted so as not to be unexpectedly detached (See FIGS. 4 and 10(*b*)). Further, the transfer belt 30 is formed, at the lower surface thereof, with a multiplicity of elastic fins 37 projecting downward and circumferentially spaced from each other at a predetermined pitch. As shown in FIG. 9, each of the fins 37 is inclined toward the upstream side in the token transfer direction as the fin extends downward. FIG. 9 illustrates the transfer belt 30 rotating clockwise. The left half of FIG. 9 illustrates the transfer belt 30 as viewed from the outer circumferential side, whereas the right half of FIG. 9 illustrates the transfer belt 30 as viewed from the inner circumferential side.

When there are no tokens 11 on the token transfer track 23 (abrasion-resistant plate 26), the lower end of each fin 37 does not slidably contact the abrasion-resistant plate 26 nor the reference guide plate 29 though held extremely close to the abrasion-resistant plate 26. On the other hand, when there exist tokens 11 on the token transfer track 23 (abrasion-resistant plate 26), the lower end of the fin 37 elastically deforms to move the tokens 11 downstream in the transfer direction while pressing the tokens against the abrasion-resistant plate 26.

The radially inward lower corner of each fin 37 of the transfer belt 30 is rounded or in the form of a cutting 37*a* for smoothly introducing tokens 11, which are released from the rotary disc 10 to the token transfer inlet 24, to between the fin and the abrasion-resistant plate 26.

The rotary disc 10 together with the transfer belt 30 can be manually rotated with the use of a gear transmission means as a driving mechanism and a power transmission unit. Specifically, a first intermediate gear 40 for meshing with gear teeth 39 of the periphery of the rotary disc 10, is rotatably supported by the upper partition plate 13. Meshing with the first intermediate gear 40, a second intermediate gear 41 is rotatably attached to a vertically-movable shaft 84 of an actuator, or solenoid 83 disposed below, and is biased upward by a coil spring 85 loosely fitted around the shaft 84. A third intermediate gear 42 for meshing with the second intermediate gear 41 has a shaft 46 which projects upward through a cover 43 covering the upper surface of the upper partition plate 13. The shaft 46 is provided, at the portion above the cover 43, with a transmission gear 45 attached thereto via a one way clutch 44. The transmission gear 45 meshes with gear teeth 38 formed at the outer circumference of the rotary ring 33. Thus, the rotary disc 10 is driven for rotation together with the rotary ring 33, i.e., the transfer belt 30. The above-described parts starting from the gear 40 to the transmission gear 45 constitute the driving mechanism (gear transmission means). The teeth 38 provided at the outer circumference of the rotary ring 33 constitute the power transmission unit.

During the batch processing mode to be described later, the driving of the transfer belt 30 can be temporarily stopped (paused) in the following manner. When the electromagnetic solenoid 83 is OFF, the shaft 84 is in a protruding position. In this state, the second intermediate gear 41, being biased upward by the coil spring 85, meshes with the first intermediate gear 40 and with the third intermediate gear 42, to transmit the rotational force of the rotary disc 10 to the transfer belt 30. When the electromagnetic solenoid 83 is ON, on the other hand, the shaft 84 retreats (moves downward). Accordingly, the second intermediate gear 41 moves downward against the biasing force by the coil spring 85, to be released from the engagement with the first intermediate gear 40 and the third intermediate gear 42. As a result, the power is not transmitted to the transfer belt 30.

Fixed to the shaft 46 which rotates together with the third intermediate gear 42, a toothed disc 86 as a detection object of a rotary encoder is disposed below the upper partition plate 13. A photointerruptor 87 is also disposed below the upper partition plate 13 to sandwich the tooth portion of the disc 86. The photointerruptor 87 measures the displacement of the transfer belt 30 and hence the displacement of the tokens 11 having passed a photo sensor unit 52 to be described later. The displacement of the transfer belt 30 may be measured by a non-contact type proximity sensor fixed in facing relationship to the tooth portion 38.

Referring to FIG. 5, when the handle 17 is rotated clockwise to rotate the rotary disc 10 in the arrow A direction (clockwise), the transfer belt 30 rotates in the same direction. At this time, the circumferential speed of the transfer belt 30 is preferably equal to or slightly lower than that of the periphery of the rotary disc 10. When the circumferential speed of the transfer belt 30 is excessively high, a great centrifugal force is exerted on the tokens 11 carried by the transfer belt 30. As a result, the tokens 11 to be transferred are likely to deviate away from the outer edge 29*a* of the reference guide plate 29, which may increase sorting errors.

When the tokens 11 jam at a portion adjacent the token transfer inlet 24 for example, the handle 17 is rotated counterclockwise. At this time, the transfer belt 30 is kept stationary due to the operation of the one way clutch 44.

As shown in FIG. 5, the outer edge 29*a* of the reference guide plate 29, which constitutes the inner circumferential wall of the token transfer track 23, is close to the periphery of the rotary disc 10 at a portion adjacent the token transfer inlet 24 and gradually deviates away from the periphery of the rotary disc 10 as it extends toward the downstream side. Specifically, the reference guide plate 29 is configured to bulge as viewed in plan between the token transfer inlet 24 and the token discerner 31 so that the outer edge 29*a* comes close to the inner circumference of the transfer belt 30.

On the other hand, the ring-shaped transfer belt 30, which is disposed above the token transfer track 23, is close to the outer circumferential wall 47 of the token transfer track 23 at a portion adjacent the token transfer inlet 24 and comes close to the outer edge 29*a* of the reference guide plate 29 as it extends toward the downstream side in the transfer direction.

Therefore, referring to FIG. 5, when each of the tokens 11 on the rotary disc 10 rotating clockwise is released to the token transfer inlet 24 due to the centrifugal force, the token 11 is caught by the radially inward lower end of the fin 37 of the transfer belt 30 rotating together with the rotary disc. As the transfer belt 30 rotates, the token 11 is transferred by rotating together with the fin 37. At this time, the fin 37 presses the token 11 against the upper surface of the abrasion-resistant plate 26 (token transfer track 23) while elastically deforming so that the lower end of the fin is inclined by a larger amount toward the upstream side in the transfer direction.

Before each of the tokens 11 transferred downstream reaches the token discerner 31, the outer edge of the token 11 is pressed against and slides along the outer edge 29*a* of the reference guide plate 29. Therefore, by setting detection positions as will be described later, the diameter of the token 11 can be accurately determined at the token discerner 31 by referring to the distance from the outer edge 29*a*.

Although the transfer belt 30 and the rotary disc 10 are concentrically arranged in the illustrated embodiment, the transfer belt 30 may be arranged eccentrically relative to the rotary disc 10.

Figure 11:
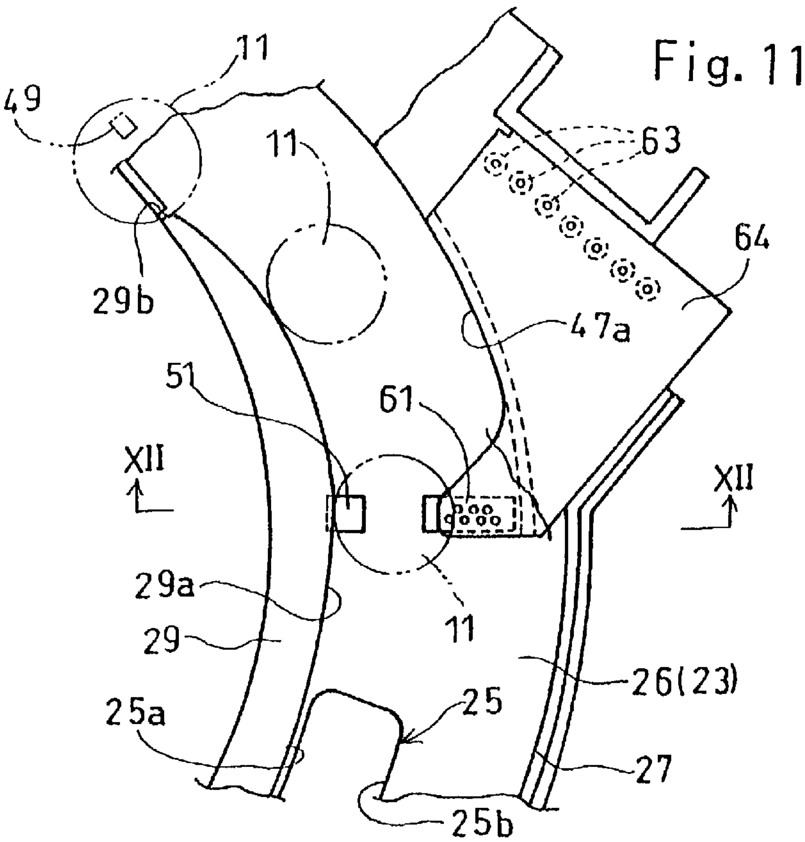
FIG. 11 is a plan view showing the token transfer inlet and the token discerner.

The outer circumferential wall 47 of the token transfer track 23 includes an introduction guide wall 47*a* extending between the transfer inlet 24 and the token discerner 31 (See FIGS. 5 and 11). Preferably, the distance between the introduction guide wall 47*a* and the outer edge 29*a* of the reference guide plate 29 gradually decreases toward the token discerner 31, and the distance is preferably equal to or slightly larger than the maximum diameter of the tokens 11 to be sorted. With this structure, even when the token 11 deviates radially outward of the transfer belt 11, the token 11 is guided along the introduction guide wall 47*a* to come close to the outer edge 29*a* of the reference guide plate 29. Therefore, erroneous determination of the diameter of the token 11 can be eliminated.

Although the fin 37 is flat and extends radially of the rotary ring 33 in the above-described embodiment, the fin may be a round bar or a square bar. Alternatively, a plurality of (two to four) ring-shaped fins each projecting downward and having a relatively small thickness in the radial direction may be arranged concentrically with the rotary disc.

The rotary ring 33 is provided with a downwardly projecting auxiliary elastic member 49 made of rubber for example for preventing stagnation of the tokens 11 at the token transfer inlet 24. In one embodiment, as shown in FIGS. 10(*a*), 10(*b*), 10(*c*) and 11, the auxiliary elastic member is so arranged as to pass radially inward of the transfer belt 30 but slightly radially outward of a tip end 29*b* of the reference guide plate 29 adjacent the token transfer inlet 24. Specifically, the rotary ring 33 is radially inwardly provided with a vertically penetrating fixing hole 50 into which the auxiliary elastic member 49 in the form of a bar made of rubber is inserted from below. The fixing hole 50 is upwardly provided with engagement projections 50*a*, 50*b* for preventing the upper portion of the auxiliary elastic member 49 from coming off.

Figure 12:
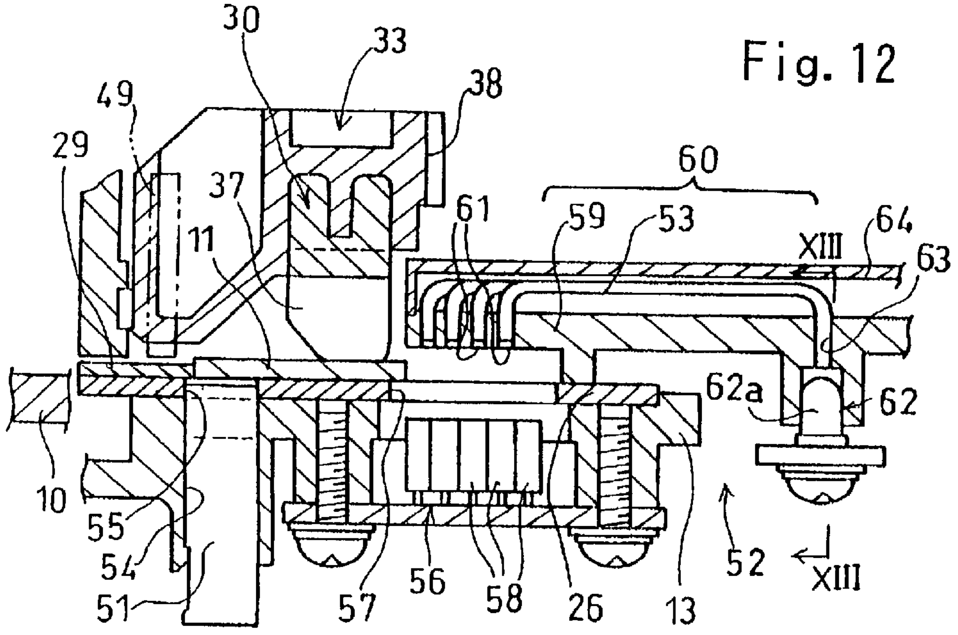
FIG. 12 is an enlarged sectional view taken on lines XII—XII in FIG. 11.
Figure 13:
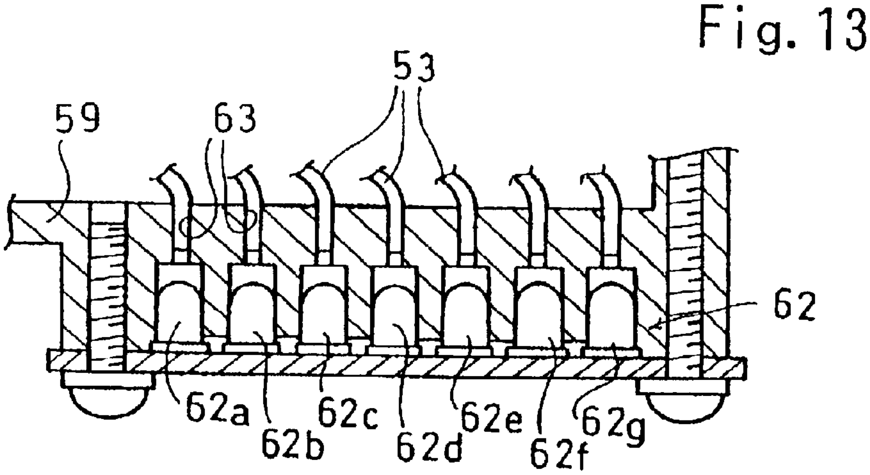
FIG. 13 is a sectional view taken on lines XIII—XIII in FIG. 12.

The lower end surface of the auxiliary elastic member 49 is held out of contact with the upper surface of the reference guide plate 29 having a thickness smaller than that of the tokens 11 (See FIG. 12). Further, the lower end surface of the auxiliary elastic member 49 moving together with the rotation of the rotary ring 33 comes into contact with the upper surface of the token 11 which has become radially unmovable neither outwardly nor inwardly as a result of hitting against the tip end 29*b* of the reference guide plate 29 and flicks the token 11 radially outwardly as much as possible. In this embodiment, two auxiliary resilient members are provided at opposite positions diametrically of the rotary ring 33 (generally 180° opposite positions).

The token discerner 31 is disposed in the token transfer track 23 between the token transfer inlet 24 and the sorting hole 25 at the most upstream position (the sorting hole 25 for the smallest token 11). The token discerner 31 includes a magnetic sensor 51 for detecting the number of passed tokens 11, and a photo sensor unit 52 provided with photo transmission cables 53 made of optical fibers for detecting the diameter of each token 11. The magnetic sensor 51 can detect tokens 11 made of metals such as copper, brass, cupro-nickel, aluminum, nickel, steel for example. The magnetic sensor 51 is fixedly attached from below to a fixing hole 54 formed in the upper partition plate 13 of the lower casing at a position close to the outer edge 29*a* of the reference guide plate 29 in facing relationship to a hole 55 formed in the abrasion-resistant plate 26 (See FIG. 12).

The photo sensor unit 52 includes an infrared emitting portion 56 comprising light-emitting elements 58 such as infrared-emitting diodes arranged below an elongated slot

57 extending in the abrasion-resistant plate 26 perpendicularly to the transfer direction of the tokens 11. The light-emitting elements are arranged generally in a row extending longitudinally of the slot 57 for emitting light upwardly. The photo sensor unit 52 further includes a light receiving portion 60 comprising a plurality (seven in this embodiment) of detection holes 61*a*–61*g* formed in a sensor casing 59 fixedly disposed in facing relationship to the slot 57 via the abrasion-resistant plate 26, and light receiving elements 62*a*–62*g* corresponding in number to the detection holes 61 and fixed to the sensor casing 59 as spaced from the detection holes 61, and the corresponding number of photo transmission cables 53 for connecting therebetween. Each of the photo transmission cables 53 has one end (light input end) fixedly inserted into a corresponding one of the detection holes 61*a*–61*g* and the other end (light output end) fixedly inserted into a corresponding one of holes 63 provided in facing relationship to the light receiving elements 62*a*–62*g*. The upper side of the sensor casing 59 is covered with a cover plate 64 so that unnecessary light from above (external portions) does not enter the detection holes 61*a*–61*g*, the photo transmission cables 53 and the holes 63.

When a token 11 made of a metal passes the magnetic sensor 51, a detection signal is outputted as a pulse (which is generally rectangular). Almost at the same time, a diameter-indicating signal is outputted as a pulse (which is also generally rectangular) as the token 11 having a predetermined diameter passes across the light receiving elements 62*a*–62*g*. These signals are inputted via an interface (not shown) to a CPU 66 as an electronic controlling unit 65 (See FIG. 20) such as a microcomputer. In the CPU 66, the count of tokens 11 for each kind and the total count of the tokens 11 are calculated. The results (the count and amount (sum) of the tokens 11 for each kind as well as the total count and amount (total sum) of the tokens) may be stored in a RAM (random-access memory) and can be numerically displayed on the display 7 by operating the display switches 8*a*. The ROM (read-only memory) is provided to store a control program such as the control algorithm and control programs for the batch processing mode and the denomination-specific batch processing mode to be described later. The controller 65 may be accommodated at an appropriate position of the lower casing 2 or the upper casing 3.

Figure 14:
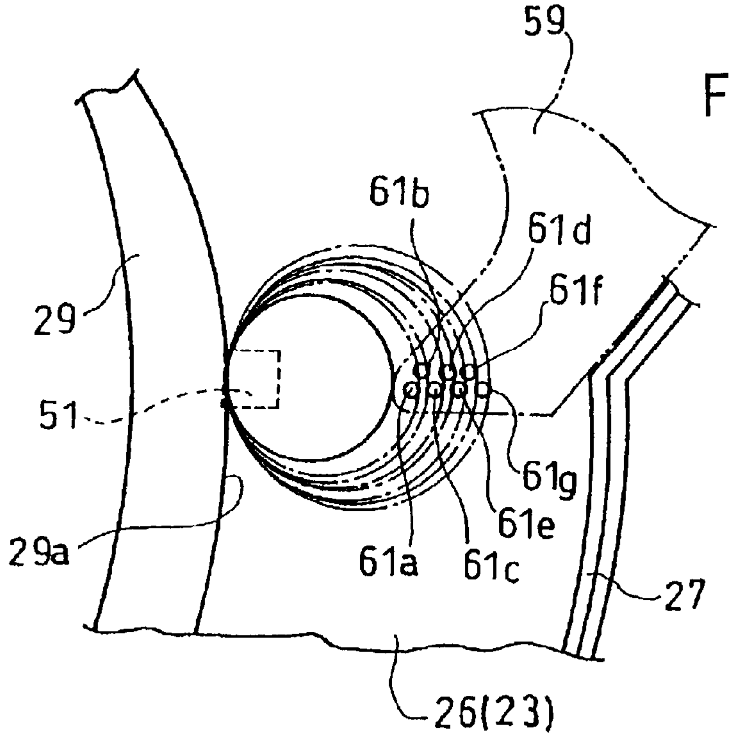
FIG. 14 is an enlarged plan view showing detection holes.
Figure 15:
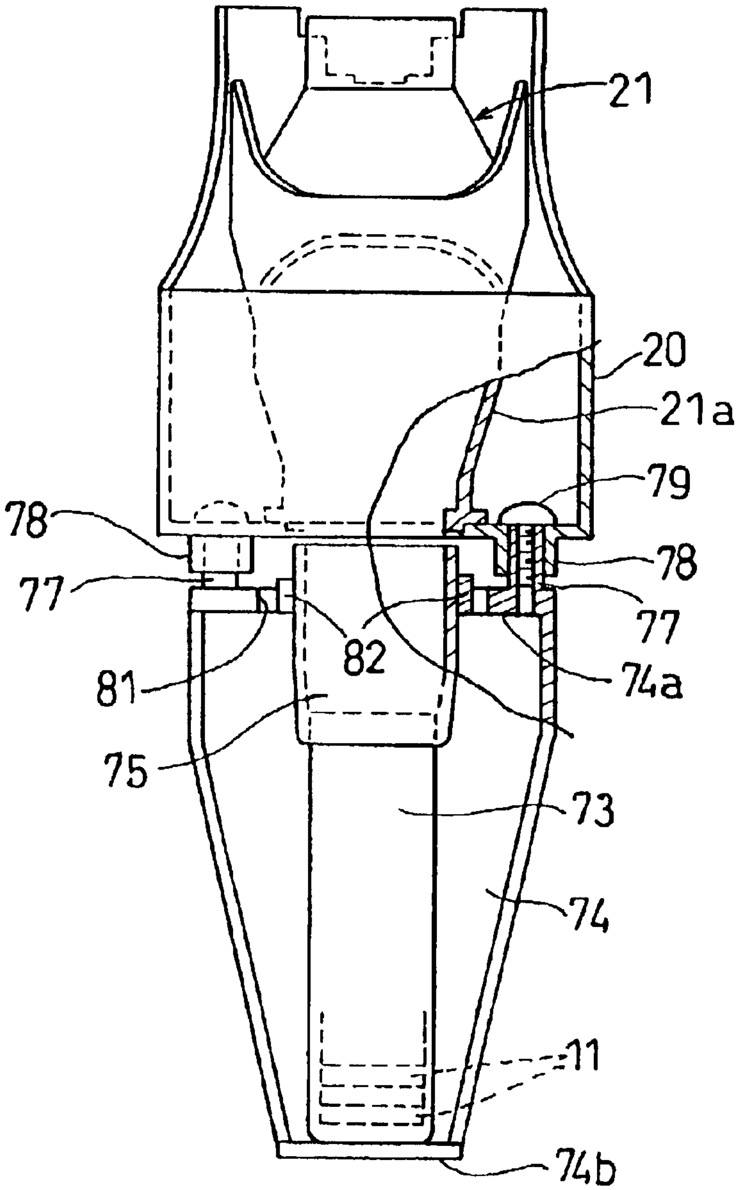
FIG. 15 is a front view of the storage unit, which is partially cut away.
Figure 16:
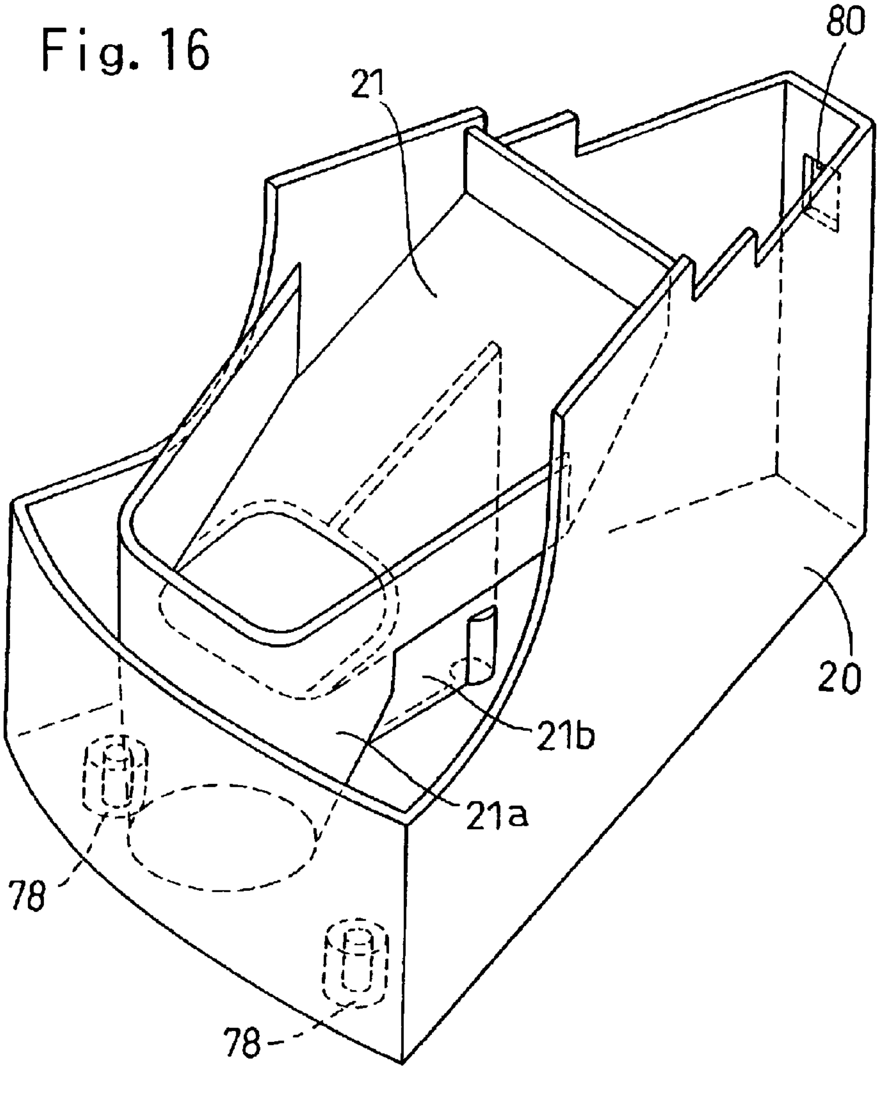
FIG. 16 is a perspective view showing a storage box and a slide portion in the storage unit.

As shown in FIG. 14, the detection holes 61*a*–61*g* are so arranged as to discern the tokens of progressively increasing diameters. That is, when a token 11 passing is sensed (detected) only by the magnetic sensor 51, the token is determined to be 0.01 EURO coin which has the smallest diameter (=16.25 mm). When a token 11 passing is detected by the magnetic sensor 51 as well as by the detection hole 61*a*, the token 11 is determined to be 0.02 EURO coin (diameter: 18.75 mm). When a token 11 passing is detected by the magnetic sensor 51 as well as by the detection holes 61*a*, 61*b*, the token 11 is determined to be 0.10 EURO coin (diameter: 19.75 mm). Similarly, a token detected by the magnetic sensor 51 as well as the detection holes 61*a*, 61*b*, 61*c* is determined to be 0.05 EURO coin (diameter: 21.25 mm), a token detected by the magnetic sensor 51 as well as the detection holes 61*a*, 61*b*, 61*c*, 61*d* is determined to be 0.20 EURO coin (diameter: 22.25 mm), a token detected by the magnetic sensor 51 as well as the detection holes 61*a*, 61*b*, 61*c*, 61*d*, 61*e* is determined to be 1 EURO coin (diameter: 23.25 mm), a token detected by the magnetic sensor 51 as well as the detection holes 61*a*, 61*b*, 61*c*, 61*d*, 61*e*, 61*f* is determined to be 0.50 EURO coin (diameter: 24.25 mm), and a token detected by the magnetic sensor 51 as well as the detection holes 61*a*, 61*b*, 61*c*, 61*d*, 61*e*, 61*f*, 61*g* is determined to be 2 EURO coin (diameter: 25.75 mm).

For the tokens like monetary coins where tokens differ diametrically from one another stepwise by about 1.0–1.5 mm and where the manufacturing errors are very minor with respect to the diameter of each token, accurate stepwise discernment of tokens may be performed by employing detection holes 61 of a small diameter. Further, owing to the arrangement where the light receiving elements 62 are arranged as spaced from the detection holes 61 and connected to the detection holes by the photo transmission cables 53 for signal transmission, the necessity for using extremely small light receiving elements can be eliminated. (Although the transmission cable comprises one optical fiber having a diameter of 0.5 mm in this embodiment, the transmission cable may comprise a bundle of fibers of a smaller diameter.) Thus, the apparatus of the present invention can be manufactured from conventional parts so that the manufacturing cost can be prevented from increasing. For the light receiving element 62, use may be made of a photoconductive element, a photodiode, a phototransistor, a photo thyrister or the like. Further, by incorporating the detection holes 61 and the light receiving elements 62 in the sensor casing 59, the manufacturing accuracy as well as the detection accuracy of the apparatus can be enhanced while realizing reduction of the manufacturing cost.

In another embodiment, for the photo sensor (light receiving element) for determining the diameter of a token, use maybe made of a line-type imaging device (CCD) or a photoelectric conversion element such as a solar battery.

The lower casing 2 is provided with an upwardly projecting lock segment 71 for engagement and disengagement relative to an engagement hole 72 formed at the front end of the upper casing 3. Thus, the upper and the lower casings 2, 3 can be kept closed (See FIGS. 1, 3 and 5).

Figure 18:
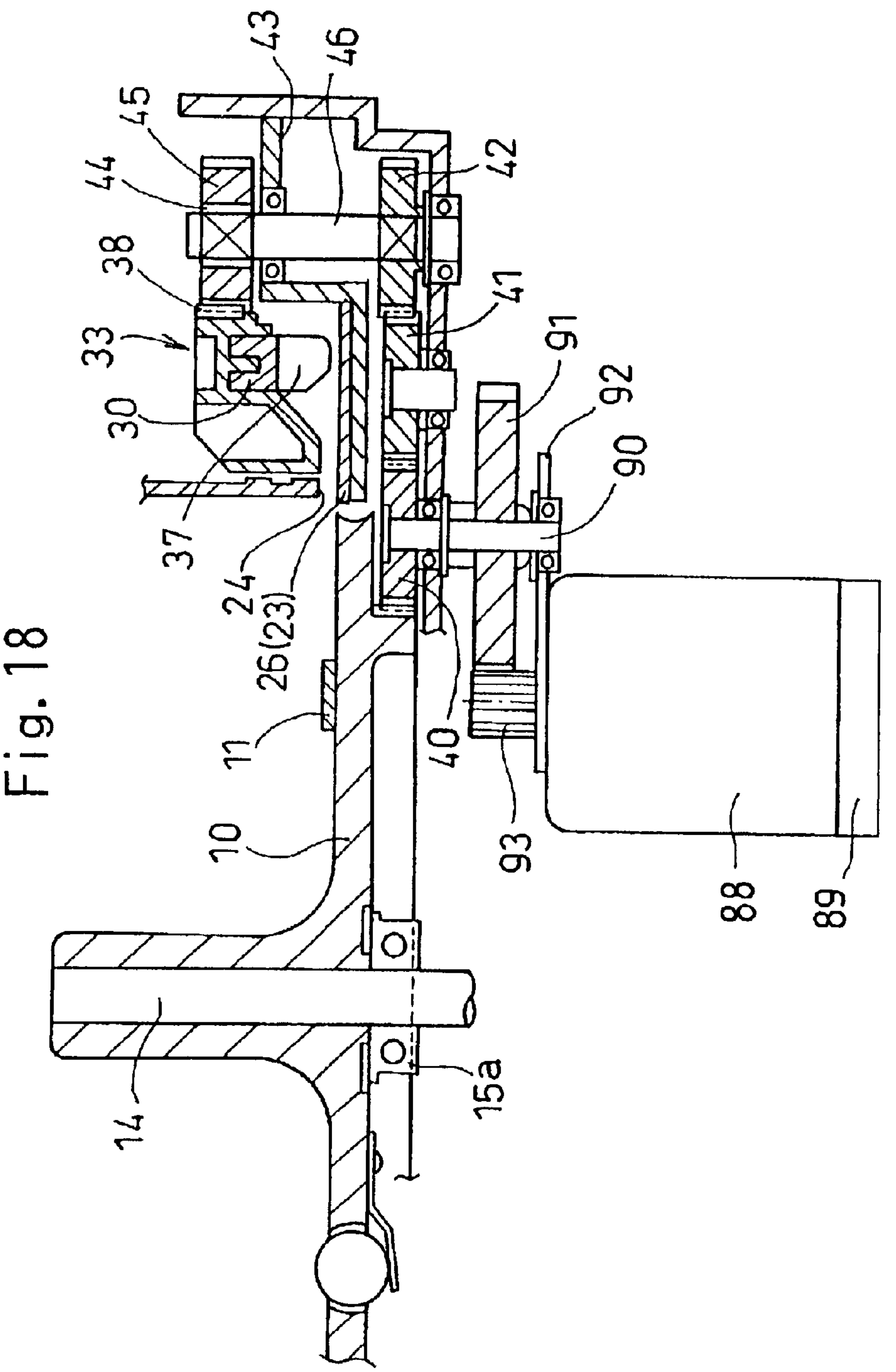
FIG. 18 is a sectional view showing a principal portion in an embodiment for driving the rotary disc and the transfer belt by an electric motor.

Referring to FIG. 18, when the rotary disc 30 is rotated with electric power, the handle 17 of the rotary disc 10 is removed. Further, the lower end of a shaft 90, to which the first intermediate gear 40 is fixed for meshing with the outer circumferential gear teeth 39 provided on the lower surface side of the rotary disc 10, is rotatably supported by a bracket 92 fixed to the lower surface of the lower casing 2. A transmission gear 91 to be rotated with the shaft 90 meshes with a pinion gear 93 of an electric motor 88. The electric motor 88 incorporates a rotary encoder 89 for detecting the number of rotation. Since the other parts of the mechanism to transmit power from the first intermediate gear 40 to the transfer belt 30 are substantially the same as those used for the manual operation, no detailed description is given. Instead of utilizing the rotary encoder 89 incorporated in the electric motor 88, use may be made of a toothed disc rotatable with the shaft 46 of the gear 42 and a photointerruptor 87, as by the manual operation discussed above.

Figure 19:
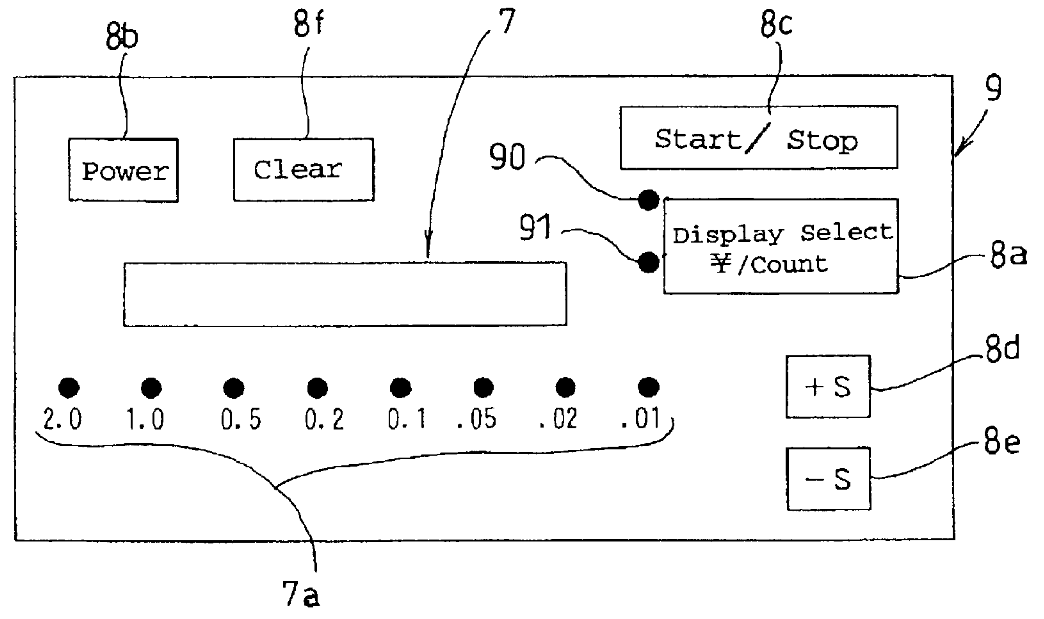
FIG. 19 illustrates the arrangement of display portion and switches as an operation portion.
Figure 20:
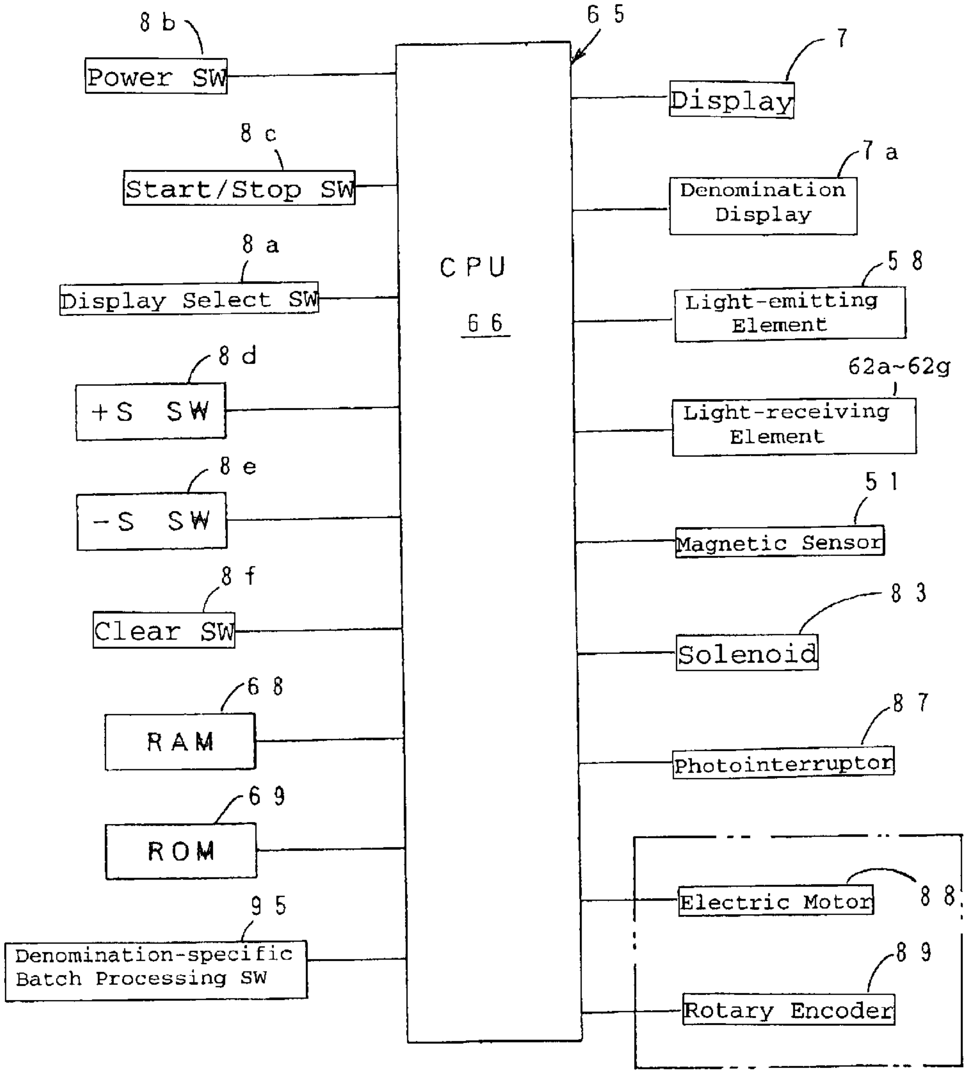
FIG. 20 is a block diagram of the controller.

Detailed description will now be given below as to the switching operation between the counting modes of the present invention (normal counting mode, unspecific batch processing mode, and denomination-specific batch processing mode) and as to the count control in each mode. FIG. 19 illustrates the details of the display 7 and the switch section 9. FIG. 20 is a block diagram showing the functional components of the controller 65. The CPU 66 is connected, via an input interface, to the power supply switch 8*b*, the display selection switch 8*a*, the start/stop switch 8*c*, the preset value increasing (+S) switch 8*d* for batch processing, the preset value decreasing (−S) switch 8*e* for batch processing, the clear switch 8*f*, the light receiving elements 62*a*–62*g*, the magnetic sensor 51, the photointerruptor 87, and a denomination-specific batch processing switch 95. Further, the CPU 66 is connected, via an output interface, to the display 7 as output means, a denomination indicating portion 7*a* for indicating the kind of tokens (8 denominations including 0.01 EURO to 2 EURO in the illustrated embodiment), and the light emitting element 58*a*–58*g*. As will be described later, when the rotary disc 10 is designed for manual rotation, the CPU is connected to the electromagnetic solenoid 83, which is operation means for temporarily interrupting the transfer of tokens in the batch processing mode based on the timing determined by the photointerruptor 87. When the rotary disc 10 is to be driven by the electric motor 88, the transfer of tokens is temporarily interrupted in the batch processing mode or in the denomination-specific batch processing mode by turning off the electric motor 88 based on the timing determined by the rotary encoder 89.

Description will now be made to the main operational flow. The apparatus is alternately turned ON and OFF every time the power switch 8*b* at the switch section 9 is pushed. When the power switch 8*b* is operated alone, the apparatus is set to the normal counting mode, in which the simple aggregate (sum) of all the tokens 11 supplied to the rotary disc 10 is calculated, and so are the individual counts and sums of the respective kinds of tokens. When the power switch 8*b* and the display selection switch 8*a* are simultaneously pushed for a predetermined second(s) (one second in the illustrated embodiment), the apparatus is set to the unspecific batch processing mode, in which the transfer of tokens 11 along the token transfer track 23 is interrupted when a predetermined number of tokens of any kind have passed through the sorting hole 25.

When the denomination-specific batch processing switch 95 is pushed with the power switch 8*b* turned on, the apparatus is set to the denomination-specific batch processing mode to be described later.

In the normal counting mode, the display 7 indicates zero by default. Tokens 11 of different kinds to be counted are supplied in this state or in advance through the token feed opening 12. Then, in the case of manual operation, the user rotates the handle 17 to sieve the tokens into the relevant one of the storage units 19 in the manner described above. In the normal counting, tokens are collected and stored in triangular storage boxes which are not provided with slide portions 21. After all the tokens 11 are counted, the sum and the count thus calculated are alternately displayed every time the display selection switch 8*a* is pushed. For example, when the sum is selected, an LED lamp 90 located at an upper portion as shown in FIG. 19 turns on. When the count is selected, an LED lamp 91 located at a lower portion as shown in FIG. 19 turns on. Every time the +S switch 8*d* is pushed, one of eight denominations of from 0.01 EURO to 2 EURO corresponding to eight points at the denomination indicating portion 7*a* or all denominations are designated, and the calculation result, i.e., the sum or the count of the tokens of the designated denomination is displayed at the display portion 7. When the clear switch 8*f* is pushed, the calculation result (stored value) is initialized.

In the unspecific batch processing mode, the preset count (or sum) for the tokens 11 to be detected by the detecting portion (the portion provided with the detection holes 61 and the magnetic sensor 51) is set to the default value. In the illustrated embodiment, the original selection is the 'count', and the default value is initially set to '50' in common for all the denominations (8 denominations from 0.01 EURO to 2 EURO). Thus, the display 7 indicates the initial value '50' by default. To change the current default value to the prescribed value of one higher rank, the increasing (+S) switch 8*d* is pushed once in the unspecific batch processing mode. To change the current default value to the prescribed value of one lower rank, on the other hand, the decreasing (−S) switch 8*e* is pushed once in the mode. In the illustrated embodiment, the prescribed default values are 20, 25, 30, 40, 50, 100, 500 and 1,000. When the clear switch 8*f* is pushed, the default value is set to the above-mentioned initial value.

Unsorted tokens 11 to be counted are fed through the token feed opening 12. Then, in the case of manual operation, the handle 17 is rotated to perform the denomination-specific counting of the tokens having passed by the detection portion (provided with the detection holes 61 and the magnetic sensor 51), as in the above-described manner. The tokens 11 dropping through the relevant sorting hole 25 slide along the slide portion 21 and pass through the cylindrical path 21*a* and the connection cylinder 75, to be stacked in the storage cylinder 73.

When the token count of any particular kind reaches the preset value, a batch processing signal is inputted to the CPU 66. By responding to the batch processing signal as a trigger, the photointerruptor 87, which detects the number of the gear teeth of the toothed disc 86, calculates the displacement over which the token 11 of that particular kind (i.e., the kind which has reached the preset value) is moved from the detection point. When the above displacement becomes equal to the distance from the detection portion to the central position (fall position) of the sorting hole 25 as viewed in the transfer direction for that particular kind of token 11, the electromagnetic solenoid 83 is turned on. As a result, as indicated by double-dot chain lines in FIG. 8, the second intermediate gear 41 moves downward, thereby being released from the meshing engagement with the first intermediate gear 40 and the third intermediate gear 42. In this way, the token 11 of the particular kind will fall through the sorting hole 25, to be stacked in the storage cylinder 73. Another example to consider is a case where a 0.01 EURO coin, a bigger 0.10 EURO coin and a much bigger 0.05 EURO coin pass the detection portion in this order and their counts will all reach the preset value. The location of the sorting hole 25 for the 0.01 EURO coin is closest to the detection portion. Thus, when the 0.01 EURO coin comes to a generally central position of the sorting hole 25 in the transfer direction, the coin will fall through the hole. Meanwhile, the solenoid 83 turns on in accordance with a batch processing signal. Thus, the token transfer operation by the belt 30 is temporarily stopped, which interrupts the progress of the subsequent 0.10 and 0.05 EURO coins. The operator will see the belt 30 coming to a standstill, while the disc 10 continues to rotate as the operator keeps rotating the handle 17. Then, the operator detaches the storage cylinder 73 for the 0.01 EURO coins having reached the preset value, and sets an empty storage cylinder 73 to the connection cylinder 75.

When the start/stop switch 8*c* is pushed again, the solenoid 83 is turned off. As a result, the second intermediate gear 41 returns to the position indicated by the solid lines in FIG. 8, in which power transmission to the transfer belt 30 resumes. Then, the operator begins to rotate the handle 17 again, whereby the 0.10 EURO coin will be brought to the predetermined position (fall position) of the sorting hole 25. The solenoid 83 is then turned on in accordance with a batch processing signal indicating the coin's arrival at the fall position. This interrupts the power transmission to the transfer belt 30, while the 0.10 EURO coin is received by the relevant storage cylinder 73. Thereafter, the full storage cylinder 73 is replaced with an empty storage cylinder 73. In this way, the batch processing can be performed with respect to all kinds of tokens 11 based on the preset values. It may be readily understood from the above explanation that such a batch processing is possible even when the tokens of different diameters are passed by the detection portion at random. The tokens 11 subjected to the batch processing may be stored in ordinary triangular storage boxes instead of the storage cylinders 73 which store only a predetermined amount of tokens.

In the case where the rotary disc 10 and the transfer belt 30 are rotated in synchronism with each other by the driving motor 88, the displacement of the token 11 to the relevant sorting hole 25 may be determined in accordance with the detection by the rotary encoder 89 and the calculation by the CPU 66 after the batch processing signal is detected. The driving motor 88 is turned off at proper timing.

Next, the denomination-specific batch processing mode will be described. In this mode, among the tokens 11 of different kinds supplied to the rotary disc 10, only the desired kind of tokens 11 are subject to batch processing, while the other kinds of tokens 11 are subjected to the normal counting and sorting processing. The single kind to be batch-processed may be specified (preset) as follows. After switching to the denomination-specific batch processing mode, a single token 11 of the desired kind to be batch-processed is fed to the token counting and sorting apparatus 1 which is initially empty. Then, the rotary disc 10 is rotated manually or by the driving motor 88 so that the kind of the token is discerned by the detection portion. The detection signal is stored in the RAM 69. Alternatively, use may be made of denomination setting switches to be selectively pushed to designate (preset) 1~3 kinds of tokens. The setting or changing of the preset values may be performed in the same manner as discussed above with respect to the batch processing mode.

Subsequently, unsorted tokens 11 of different kinds are fed through the token feed opening 12 onto the rotary disc 10. Then, the rotary disc 10 is rotated manually or by the driving motor 88 to transfer the tokens along the token transfer track 23. The kind of each token is determined at the detection point. The tokens are sorted by the sorting holes 25 and stored in the storage units 19 arranged below the holes. As in the normal counting mode, the count of each kind of tokens passing by the detection point is calculated by the CPU 66 and the result is stored. When the count for the tokens 11 of the desired kind reaches the preset value, the particular token 11 is advanced to the central position of the relevant sorting hole 25 (or for a period of time corresponding to the distance). When the token 11 of that kind falls into the storage unit 19, the power transmission to the transfer belt 30 is interrupted as in the manner described above. Then, the replacement of the storage cylinder 73 is performed in the same manner as done in the batch processing mode. The storage units 19 for tokens 11 of the non-selected kinds may be ordinary triangular storage boxes. In this way, in the denomination-specific batch processing mode, the normal counting and sorting operation is performed, while the token transfer is interrupted when the preset value (count or sum) is attained for a particular kind of tokens 11 received in the relevant storage unit 19. Thus, the management of the tokens is performed conveniently.

In any of the normal counting mode, the unspecific batch processing mode and the denomination-specific batch processing mode, the electric motor 88 is turned on and off by pressing the start/stop switch 8*c*.

It is possible to perform the normal counting mode to collect tokens of the same kind and then perform the operation of the batch processing mode with respect to the single kind of the tokens 11.

What is claimed is:

1. An apparatus for counting and sorting tokens comprising:

a rotary disc having an upper surface for supporting tokens supplied thereto, the disc being rotatable manually or by a driver;

a generally arcuate token transfer track extending along an outer circumference of the rotary disc and including one token transfer inlet for receiving the tokens across the outer circumference of the rotary disc;

a plurality of sorting holes formed in the token transfer track for successively sorting and dropping the tokens in an order of increasing diameters as the tokens are transferred from an upstream side toward an downstream side in a transfer direction;

removable collecting and storing means arranged below the sorting holes for collecting and storing the tokens sorted;

an annular transfer belt disposed above the outer circumference of the rotary disc for rotation together with the rotary disc to transfer the tokens while pressing the tokens against a surface of the token transfer track;

a token discerner provided in the token transfer track between the token transfer inlet and a sorting hole located at a most upstream position in the transfer direction for counting the tokens and determining diameters of the tokens;

a controller for calculating results obtained by the token discerner;

a display for displaying the calculated results which include the count of tokens for each kind and a total count of the tokens; and switching means for switching between a normal counting mode and a batch processing mode, the batch processing mode providing an adjustable preset value for a token count or a sum to temporarily interrupt the token transfer to the sorting holes when the preset value is attained;

wherein the controller performs the normal counting mode or the batch processing mode in accordance with switching of the switching means.

2. The token counting and sorting apparatus according to claim 1, further comprising a power transmitter arranged between the rotary disc and the transfer belt, wherein the controller operates, in the batch processing mode or in the denomination-specific batch processing mode, to cause the power trasmitter to stop power transmission to the transfer belt when the tokens travel a predetermined distance after the token discerner determines that the preset value is attained in the counting of the tokens.

3. The token counting and sorting apparatus according to claim 2, wherein the power transmitter is a gear transmitter including a plurality of gears arranged between the rotary disc and the transfer belt;

wherein an actuator is provided for moving at least one intermediate gear to selectively stop power transmission to the transfer belt; and wherein the controller operates, in the batch processing mode or in the denomination-specific batch processing mode, to cause the actuator to stop power transmission to the transfer belt when the tokens travel a predetermined distance after the token discerner determines that the preset value is reached in the counting of the tokens.

4. The token counting and sorting apparatus according to claim 1, further comprising a power transmitter arranged between the rotary disc and the transfer belt, wherein the rotary disc is rotated by a motor, and wherein the controller operates, in the batch processing mode or in the denomination-specific batch processing mode, to stop the motor for stopping rotation of the disc and the belt when the tokens travel a predetermined distance after the token discerner determines that the preset value is reached as a result of passing of the tokens.

5. The token counting and sorting apparatus according to claim 1, wherein in the batch processing mode, a common value is set as the preset value for tokens of different kinds.

6. The token counting and sorting apparatus according to claim 1, wherein the collecting and storing means is provided with a removable storage cylinder for storing a preset number of tokens that corresponds to the preset value.

7. The token counting and sorting apparatus according to claim 1, further comprising a lower casing for the rotary disc and the token transfer track and an upper casing openable on the lower casing, wherein the upper casing rotatably supports a rotary ring with which the transfer belt is associated, the upper casing being provided with a token feed opening radially inward of the rotary ring for feeding the tokens toward the rotary disc, the rotary ring being provided with a power transmission unit to be rotated by a driving mechanism arranged on a side of the lower casing.

8. An apparatus for counting and sorting tokens comprising:

a rotary disc having an upper surface for supporting tokens supplied thereto, the disc being rotatable manually or by a driver;

a generally arcuate token transfer track extending along an outer circumference of the rotary disc and including one token transfer inlet for receiving the tokens across the outer circumference of the rotary disc;

a plurality of sorting holes formed in the token transfer track for successively sorting and dropping the tokens in an order of increasing diameters as the tokens are transferred from an upstream side toward an downstream side in a transfer direction;

removable collecting and storing means arranged below the sorting holes for collecting and storing the tokens sorted;

an annular transfer belt disposed above the outer circumference of the rotary disc for rotation together with the rotary disc to transfer the tokens while pressing the tokens against a surface of the token transfer track;

a token discerner provided in the token transfer track between the token transfer inlet and a sorting hole located at a most upstream position in the transfer direction for counting the tokens and determining diameters of the tokens;

a controller for calculating results obtained by the token discerner;

a display for displaying the calculated results which include the count of tokens for each kind and a total count of the tokens; and switching means for switching between a normal counting mode and a denomination-specific batch processing mode, the denomination-specific batch processing mode providing an adjustable preset value for a token count or a sum of a predetermined particular kind of tokens to temporarily interrupt the token transfer to the sorting holes when the preset value is attained while performing the normal counting and sorting with respect to other kinds of tokens;

wherein the controller performs the normal counting mode or the denomination-specific batch processing mode in accordance with switching of the switching means.

9. The token counting and sorting apparatus according to claim 8, further comprising a power transmitter arranged between the rotary disc and the transfer belt, wherein the controller operates, in the batch processing mode or in the denomination-specific batch processing mode, to cause the power transmitter to stop power transmission to the transfer belt when the tokens travel a predetermined distance after the token discerner determines that the preset value is attained in the counting of the tokens.

10. The token counting and sorting apparatus according to claim 9, wherein the power transmitter is a gear transmitter including a plurality of gears arranged between the rotary disc and the transfer belt;

wherein an actuator is provided for moving at least one intermediate gear to selectively stop power transmission to the transfer belt; and wherein the controller operates, in the batch processing mode or in the denomination-specific batch processing mode, to cause the actuator to stop power transmission to the transfer belt when the tokens travel a predetermined distance after the token discerner determines that the preset value is reached in the counting of the tokens.

11. The token counting and sorting apparatus according to claim 8, further comprising a power transmitter arrangaed between the rotary disc and the transfer belt, wherein the rotary disc is rotated by a motor, and wherein the controller operates, in the batch processing mode or in the denomination-specific batch processing mode, to stop the motor for stopping rotation of the disc and the belt when the tokens travel a predetermined distance after the token discerner determines that the preset value is reached as a result of passing of the tokens.

12. The token counting and sorting apparatus according to claim 8, wherein in the batch processing mode, a common value is set as the preset value for token of different kinds.

13. The token counting and sorting apparatus according to claim 8, wherein the collecting and storing means is provided with a removable storage cylinder for storing a preset number of tokens that corresponds to the preset value.

14. The token counting and sorting apparatus according to claim 8, further comprising a lower casing for the rotary disc and the token transfer track and an upper casing openable on the lower casing, wherein the upper casing rotatably supports a rotary ring with which the transfer belt is associated, the upper casing being provided with a token feed opening radially inward to the roatry ring for feeding the token toward the rotary disc, the rotary ring being provided with a power transmission unit to be rotated by a driving mechanism arranged on a side of the lower casing.

* * * * *